(12) United States Patent
Ebersole et al.

(10) Patent No.: US 7,457,861 B1
(45) Date of Patent: Nov. 25, 2008

(54) OPTIMIZING VIRTUAL INTERFACE ARCHITECTURE (VIA) ON MULTIPROCESSOR SERVERS AND PHYSICALLY INDEPENDENT CONSOLIDATED NICS

(75) Inventors: Dwayne E. Ebersole, Lancaster, PA (US); Anthony Narisi, Glenmoore, PA (US)

(73) Assignee: Unisys Corporation, Blue Bell, PA (US)

( * ) Notice: Subject to any disclaimer, the term of this patent is extended or adjusted under 35 U.S.C. 154(b) by 964 days.

(21) Appl. No.: 10/728,471

(22) Filed: Dec. 5, 2003

(51) Int. Cl.
*G06F 15/173* (2006.01)
*G06F 15/16* (2006.01)

(52) U.S. Cl. .................. 709/223; 709/228; 370/258; 710/311

(58) Field of Classification Search ............ 709/202, 709/222, 223, 228; 370/258; 710/311, 317
See application file for complete search history.

(56) References Cited

U.S. PATENT DOCUMENTS

| 5,596,723 | A | * | 1/1997 | Romohr ................ 709/222 |
| 5,611,050 | A | * | 3/1997 | Theimer et al. ......... 709/202 |
| 5,999,518 | A | * | 12/1999 | Nattkemper et al. ..... 370/258 |
| 6,880,002 | B2 | * | 4/2005 | Hirschfeld et al. ....... 709/223 |
| 2003/0051021 | A1 | * | 3/2003 | Hirschfeld et al. ....... 709/223 |
| 2005/0108407 | A1 | * | 5/2005 | Johnson et al. .......... 709/228 |
| 2008/0123559 | A1 | * | 5/2008 | Haviv et al. ............. 370/255 |

* cited by examiner

*Primary Examiner*—Khanh Dinh
(74) *Attorney, Agent, or Firm*—Richard J. Gregson; Robert P. Marley

(57) ABSTRACT

Optimization of the Virtual Interface Architecture (VIA) on Multiprocessor Servers using Physically Independent Consolidated NICs (Network Interface Cards) allows for improved throughput, increased resiliency and transparent fail-over; and also by hiding the actual NICs involved in particular data transactions, enables operations with substantially unmodified applications software.

4 Claims, 21 Drawing Sheets

Figure 1 – Hardware Architecture
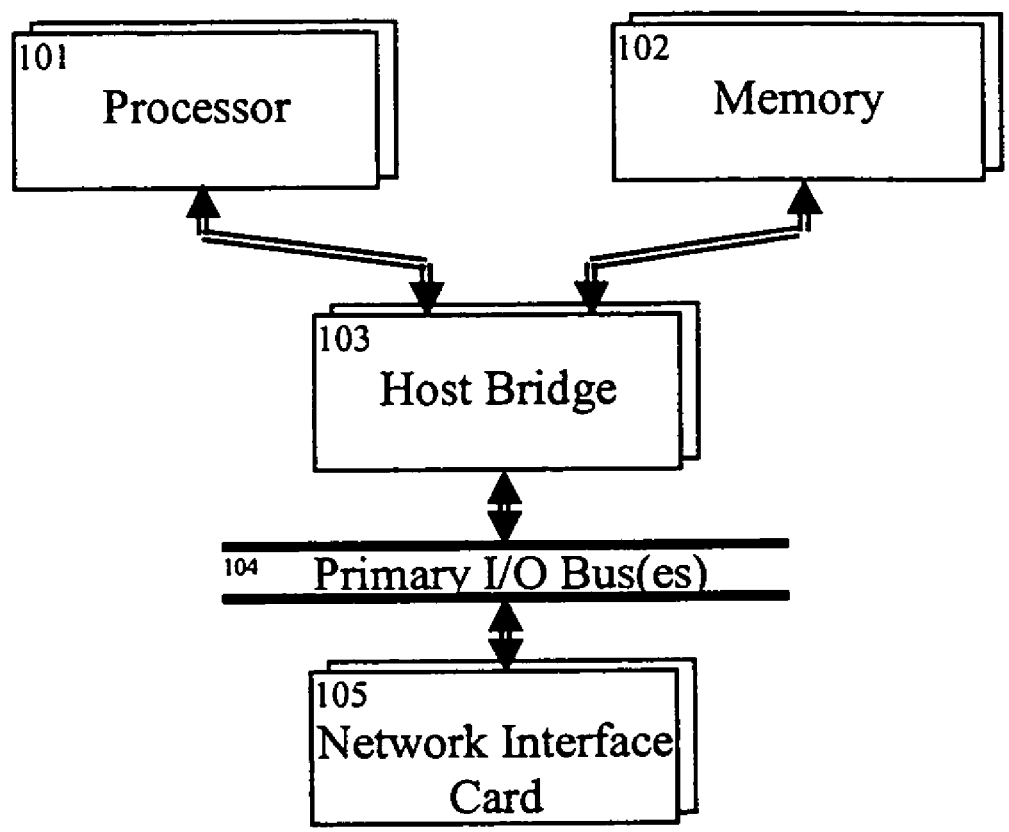

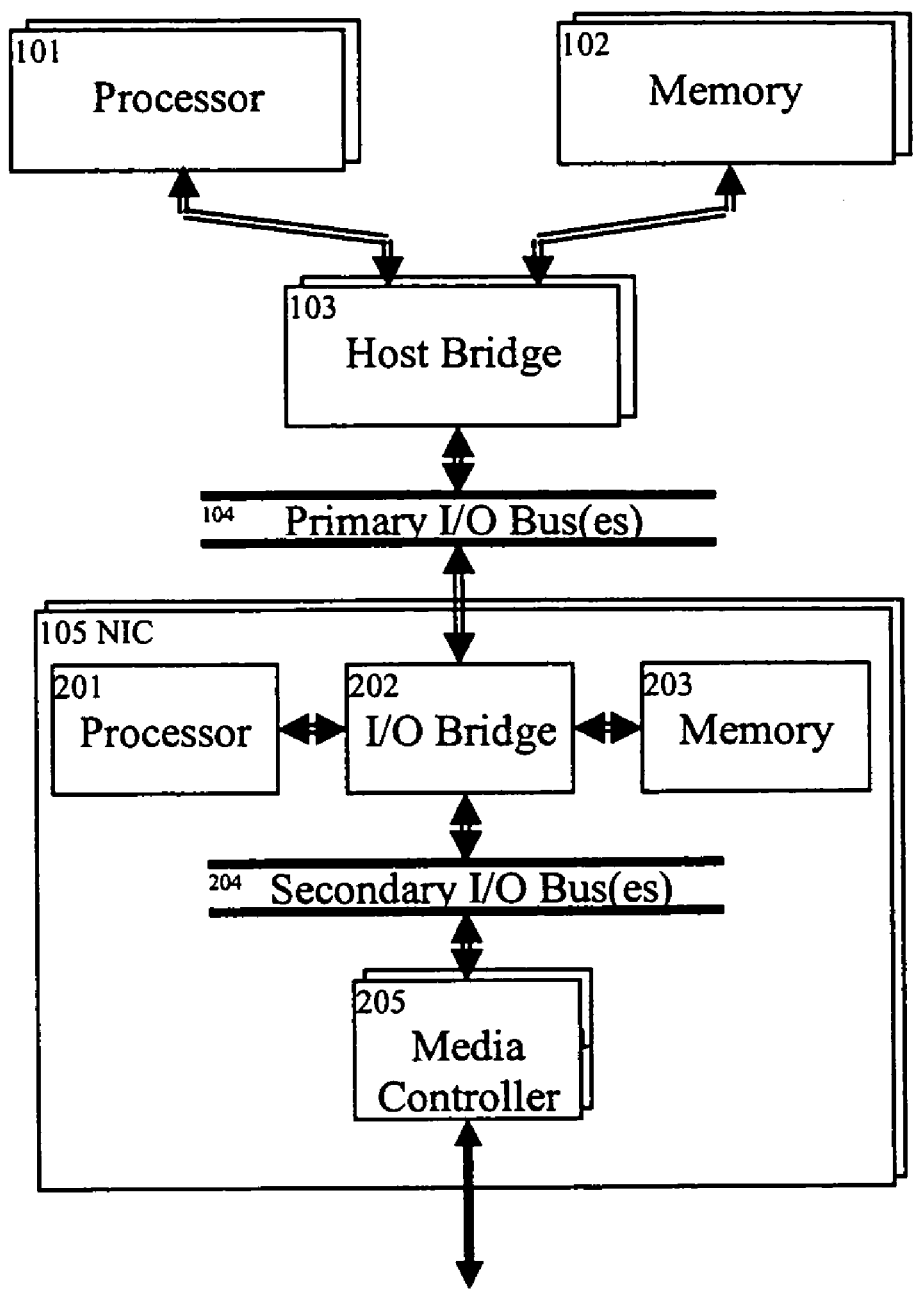
Figure 2 – NIC Hardware Architecture

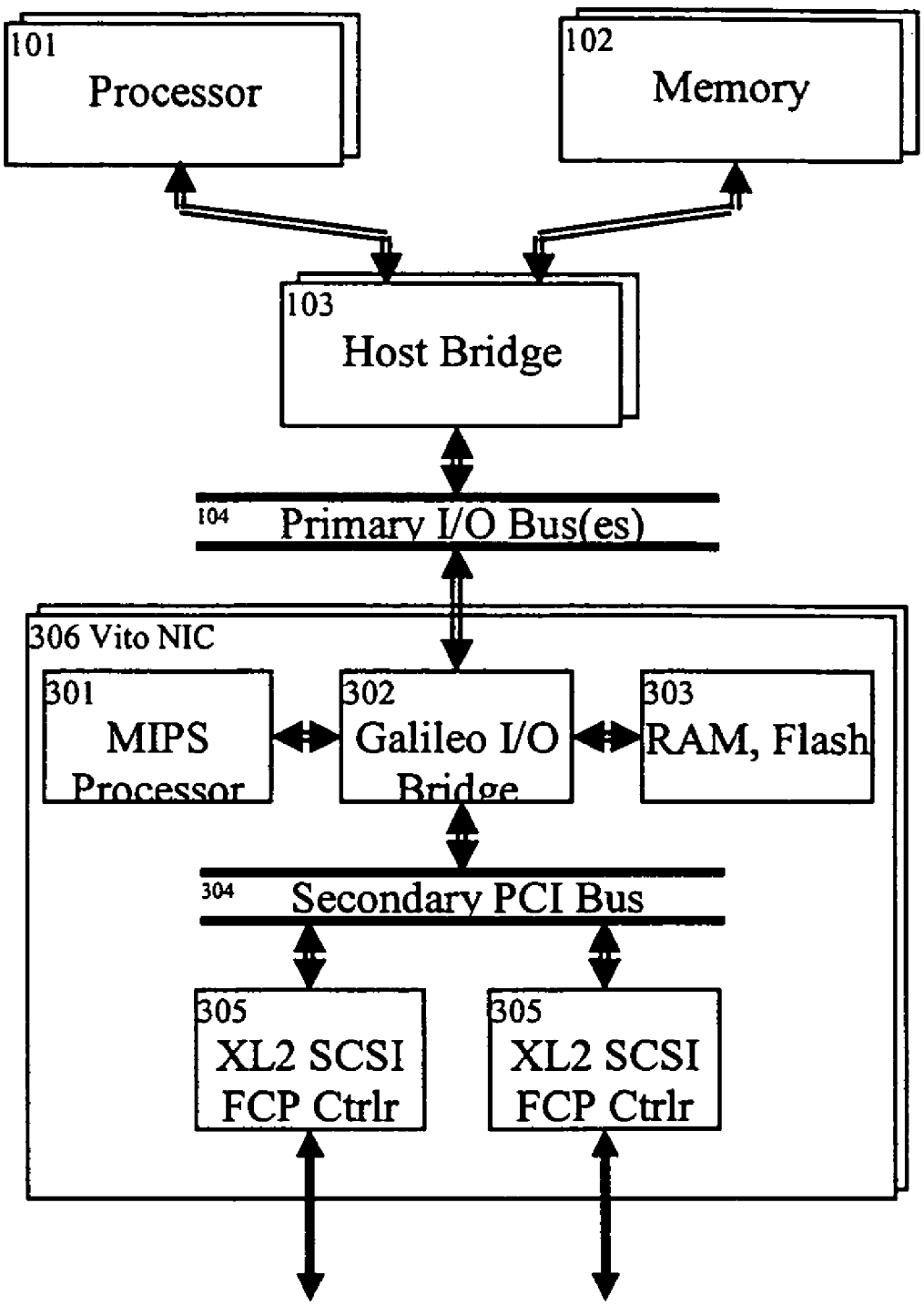
Figure 3 – Vito NIC Hardware Architecture

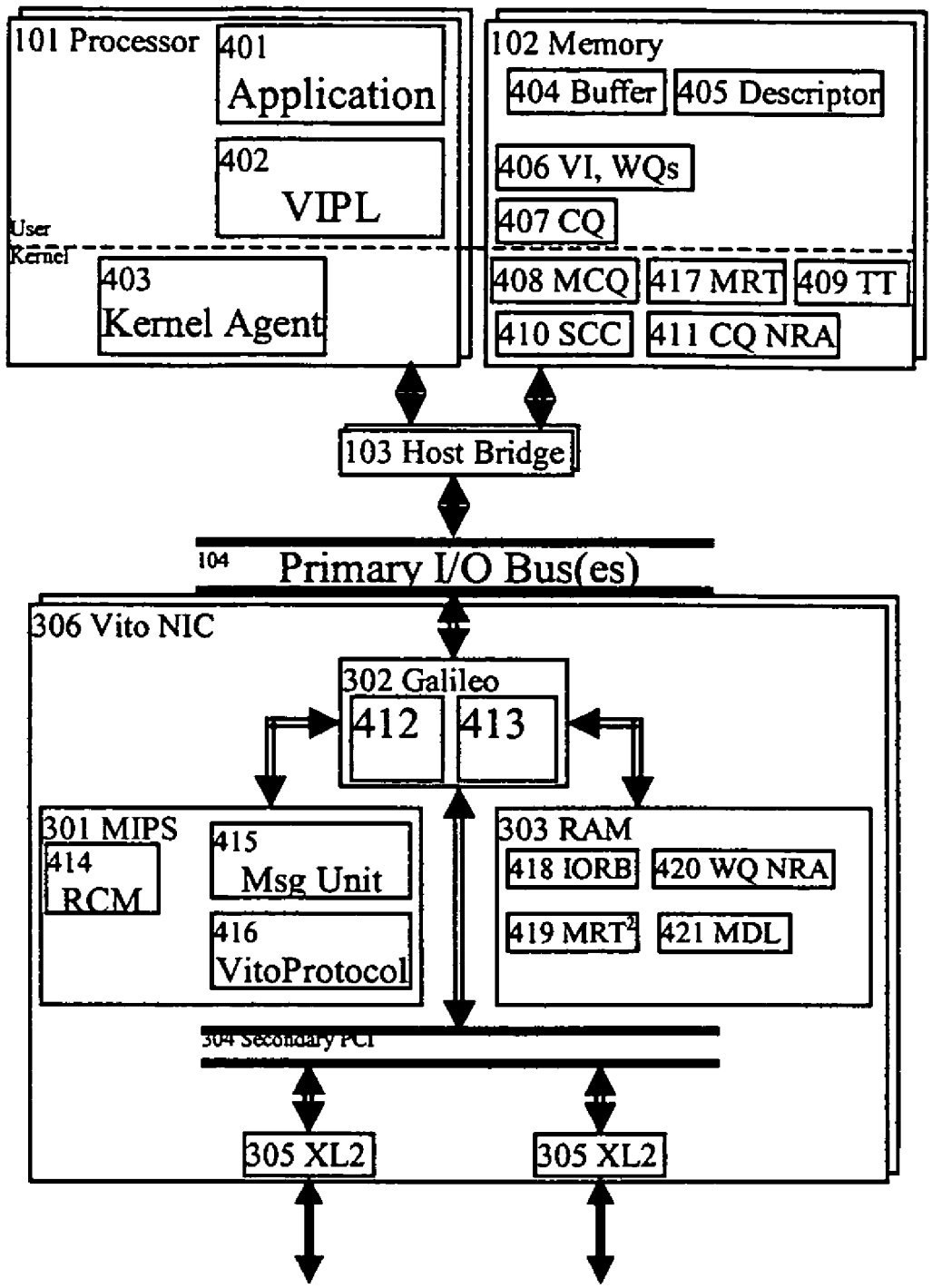
Figure 4 – Vito Software Architecture

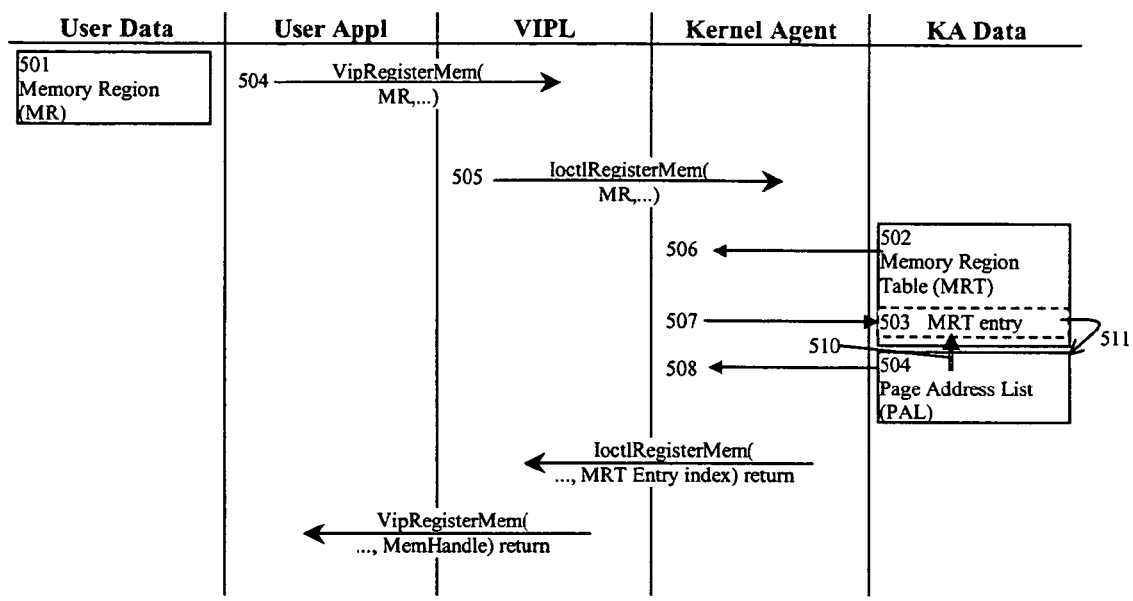
Figure 5 – Memory Registration Message Flows

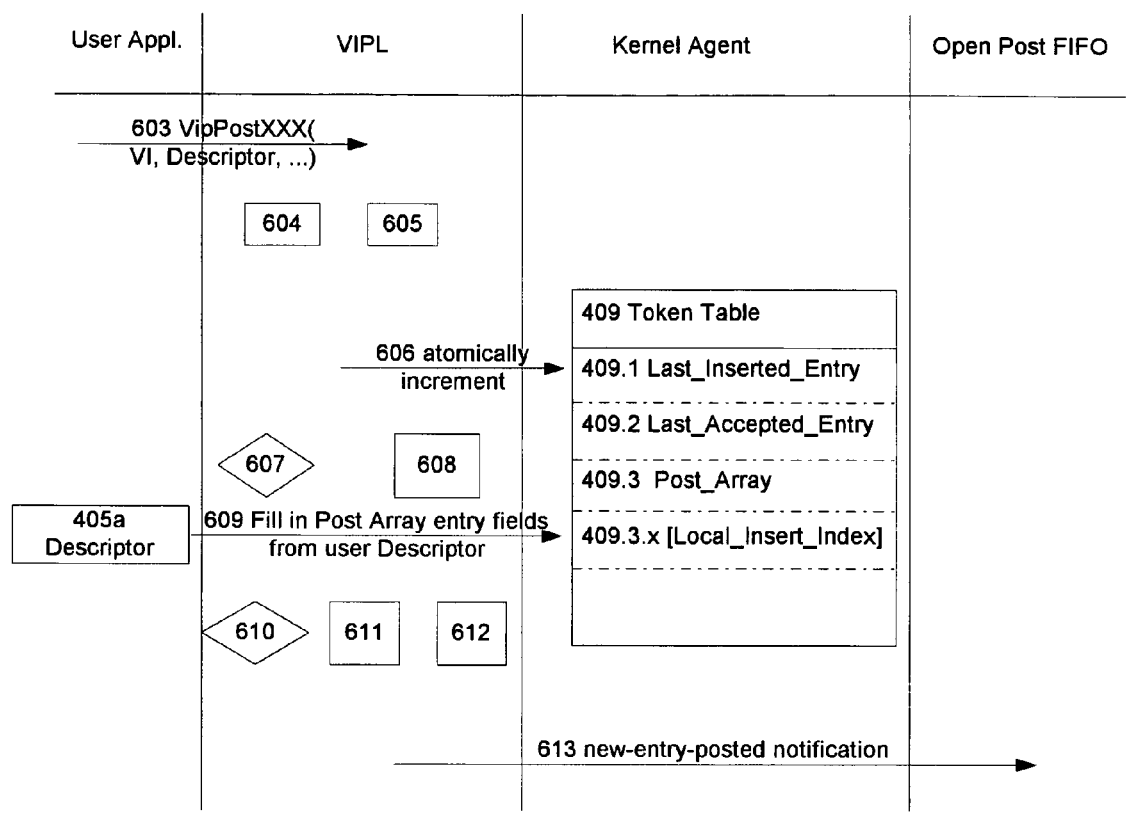
Figure 6 - Descriptor Posting Message Flows

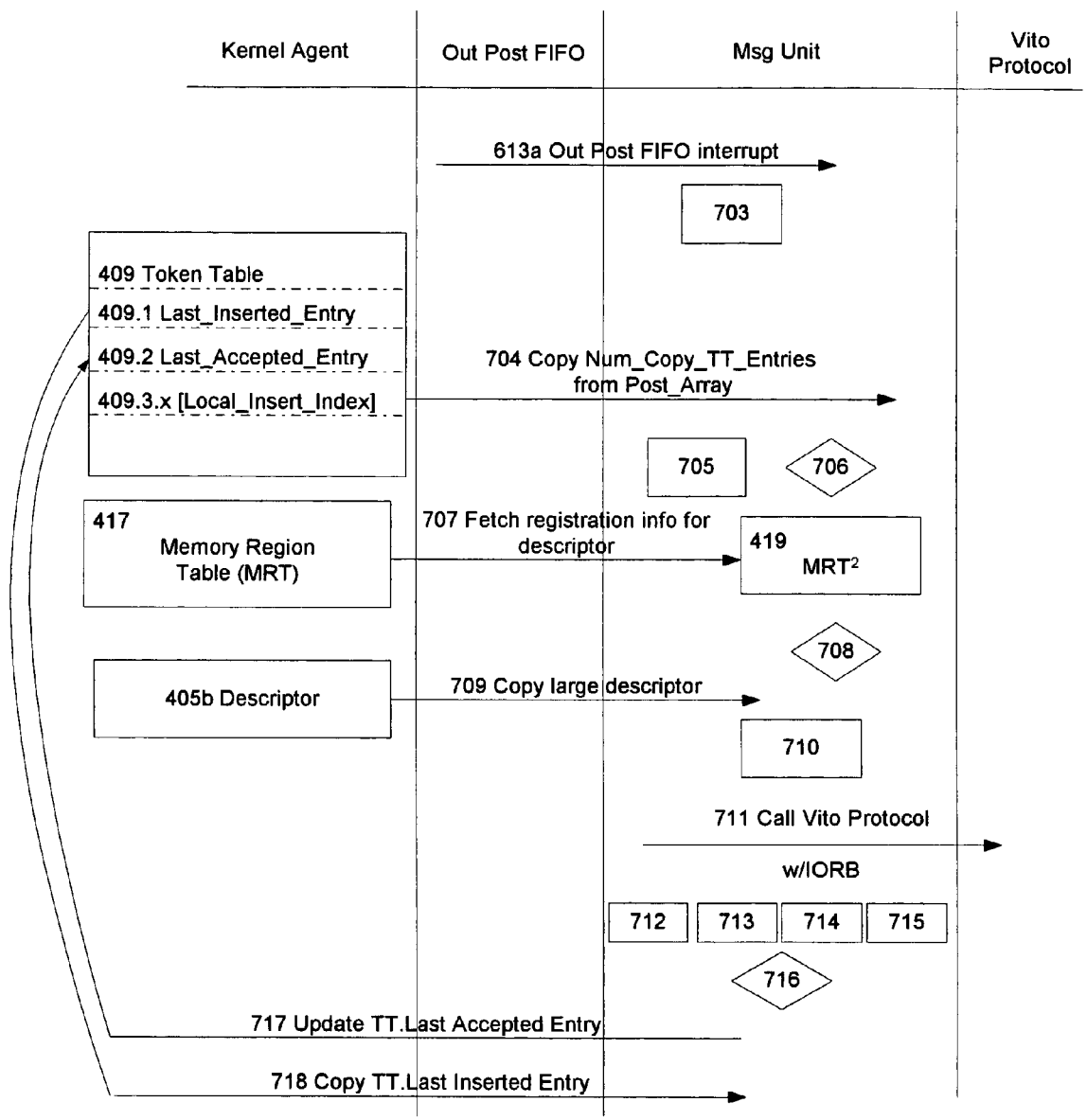

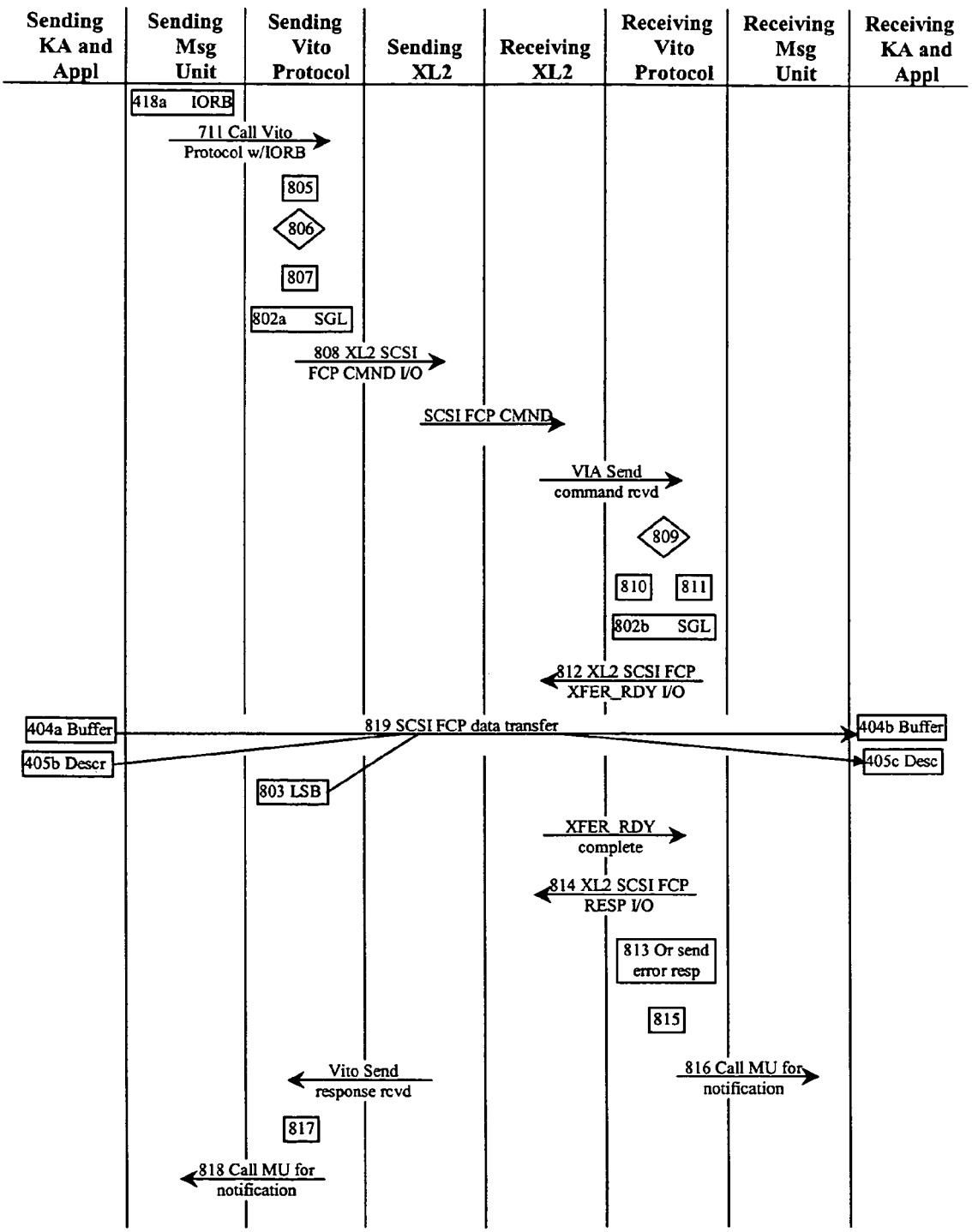
Figure 8 – Send Processing Message Flows

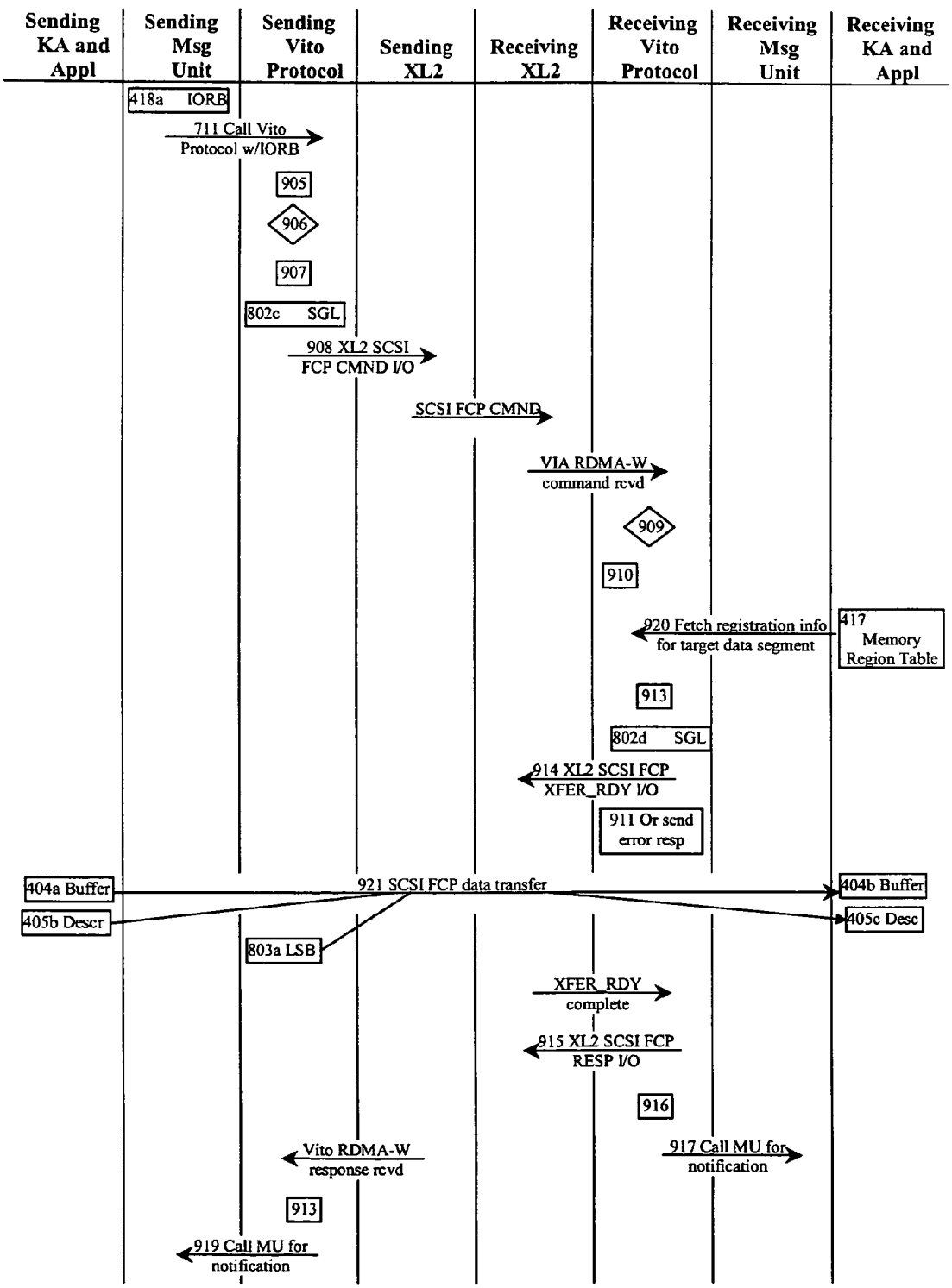
Figure 9 – RDMA-Write Processing Message Flows

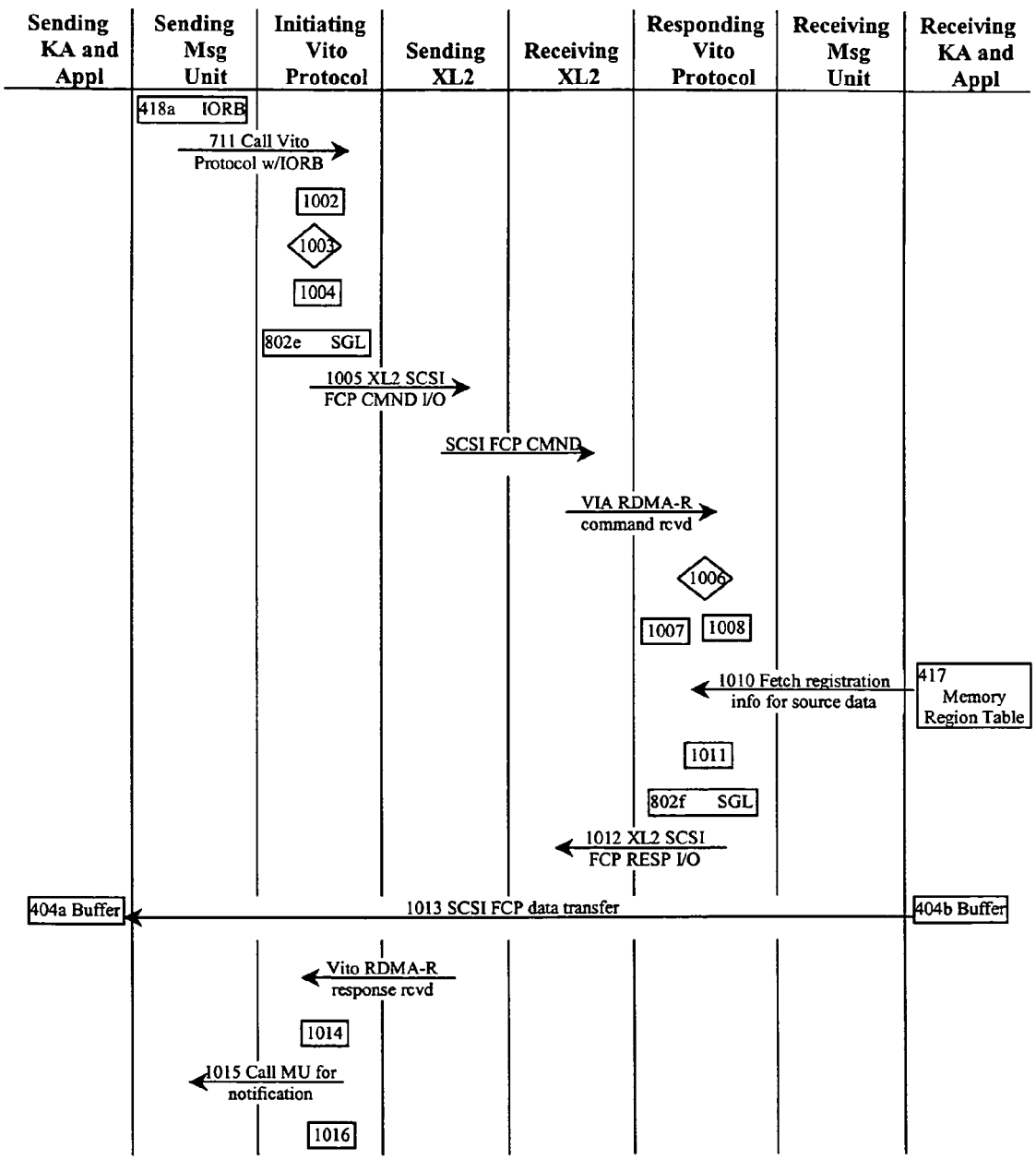
Figure 10 – RDMA-Read Processing Message Flows

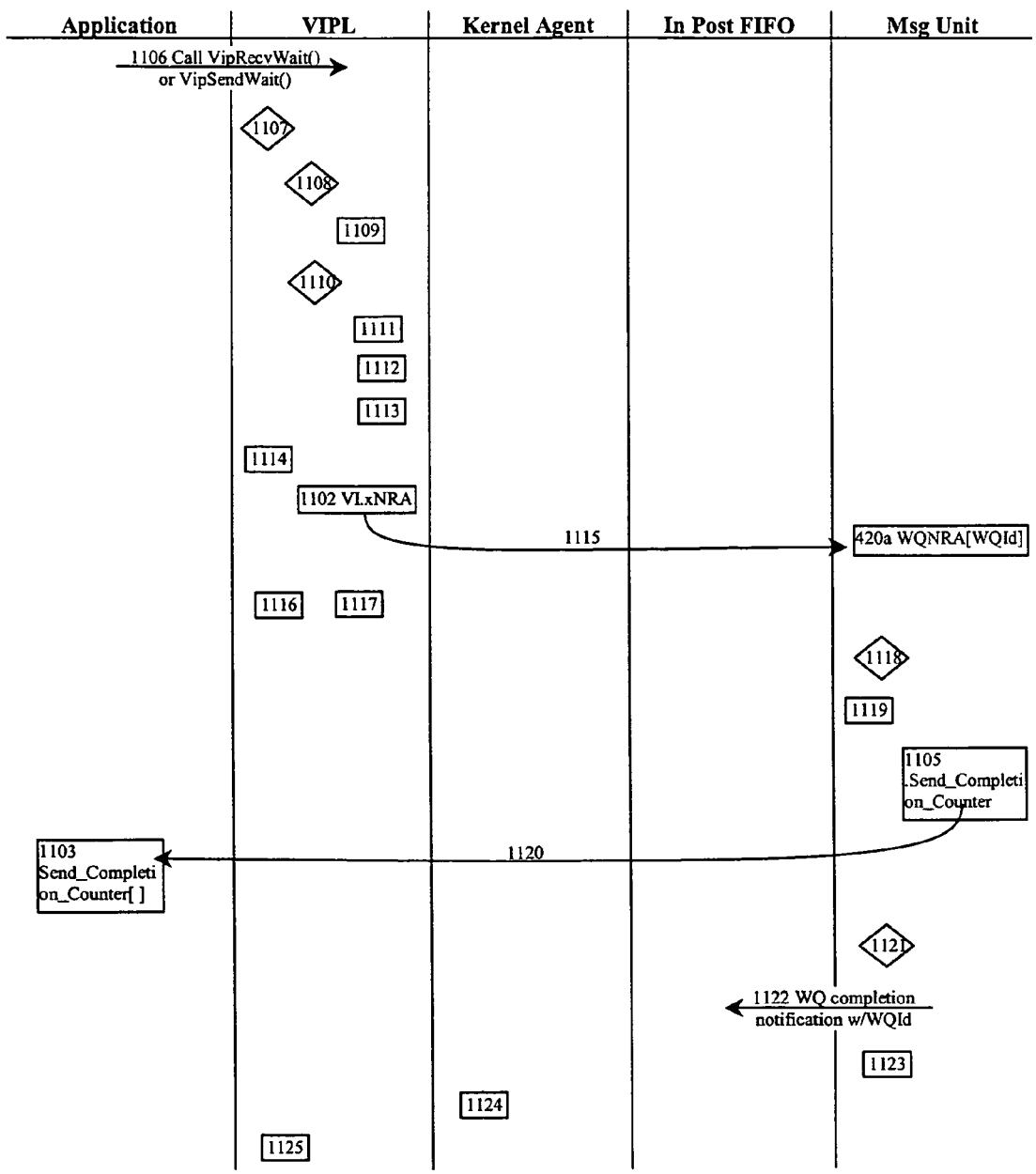
Figure 11 – Work Queue Completion Notification Message Flows

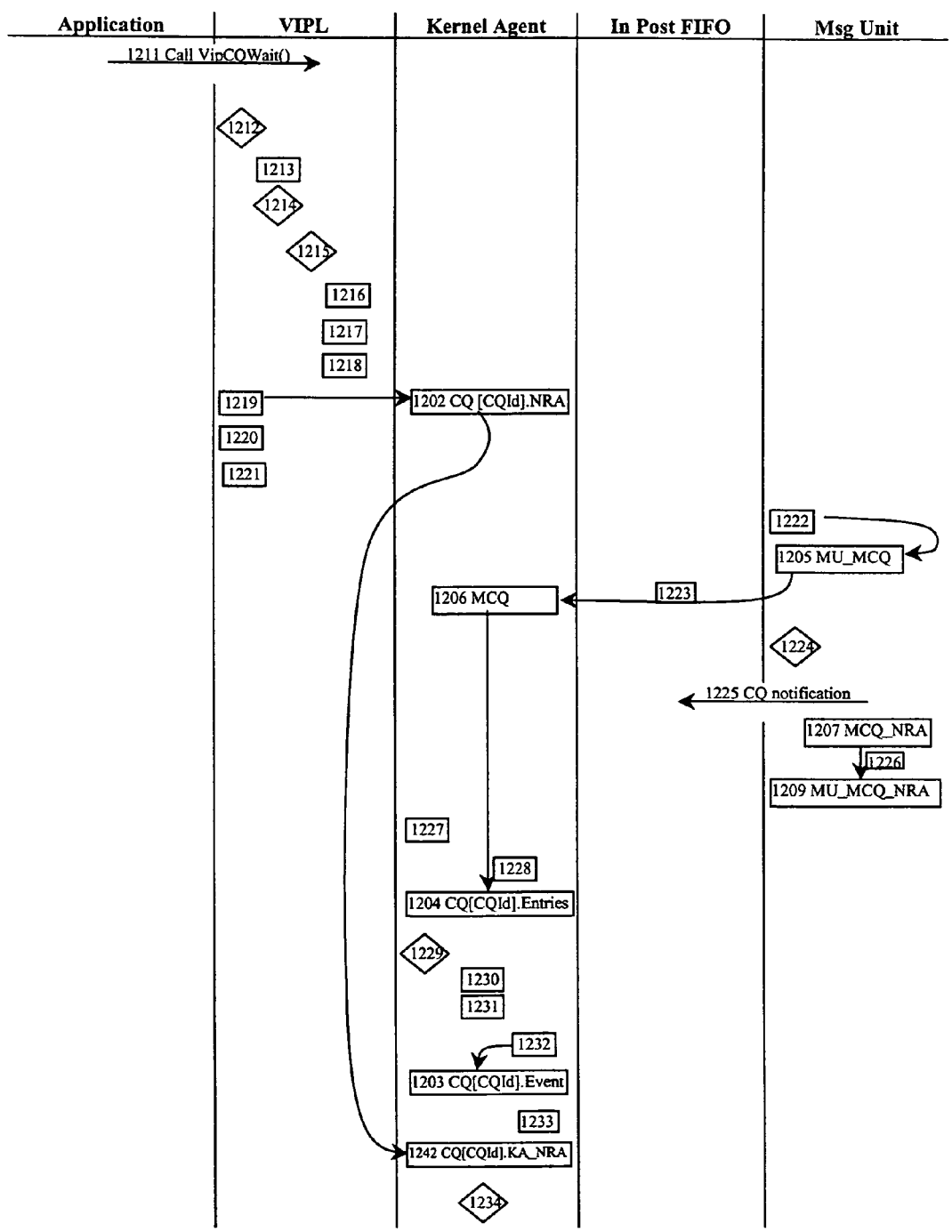
Figure 12 – Completion Queue Completion Notification Message Flows

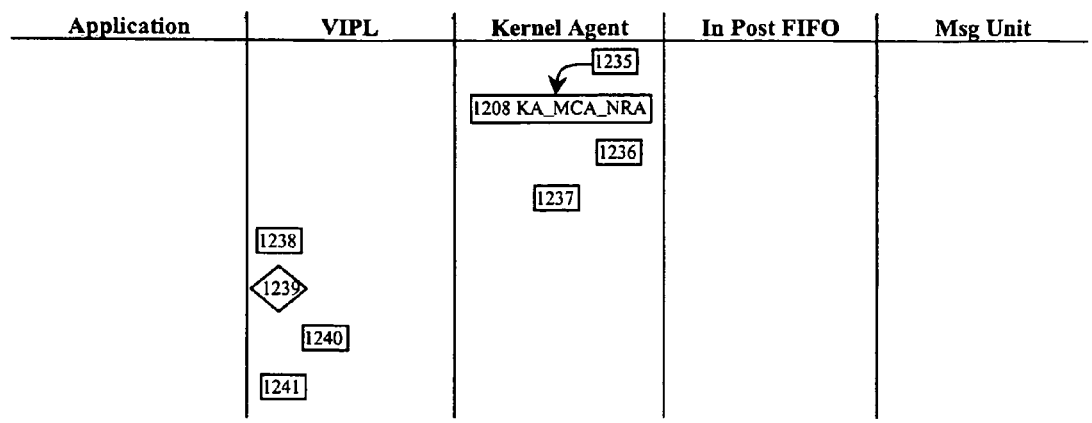
Fig. 12.2
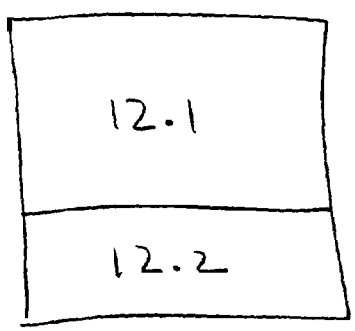

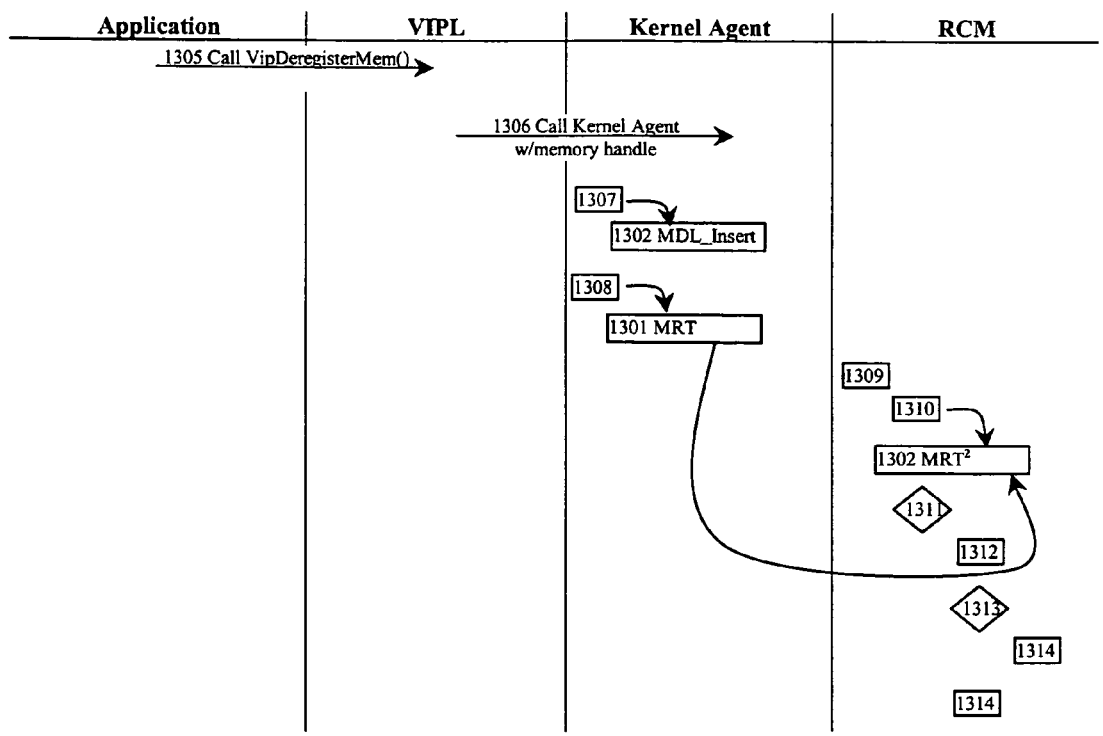
Figure 13 – Memory Deregistration Message Flows

FIGURE 14 – VITO-FC FCP_CMD IU UPDATES

SCSI Fibre Channel Protocol FCP_CMD Information Unit

| Word | Byte 0 | Byte 1 | Byte 2 | Byte 3 | |
|---|---|---|---|---|---|
| 0 | First Level LUN | | Second Level LUN | | FCP_LUN |
| 1 | Third Level LUN | | Fourth Level LUN | | |
| 2 | Cmd Ref Num | Task Codes | Task Mgmt Flags | Exec Mgmt Codes | FCP_CNTL |
| 3 | 1st Byte of CDB | | | | FCP_CDB |
| 4 | | | | | |
| 5 | | | | | |
| 6 | | | | 16th Byte of CDB | |
| 7 | Data Length | | | | FCP_DL |
| 8-n | Additional FCP_CDB | | | | Additional FCP_CDB |

Vito over SCSI Fibre Channel Protocol FCP_CMD Information Unit

| Word | Byte 0 | Byte 1 | Byte 2 | Byte 3 |
|---|---|---|---|---|
| 0 | VI Number | | Remote VI Number | |
| 1 | Reserved | | | |
| 2 | VI Control Segment Flags | | VI Operation Type | FCP R/W bits |
| 3 | Reserved | | | |
| 4 | RDMA Remote Memory Handle | | | |
| 5 | Upper RDMA Remote Memory Virtual Address | | | |
| 6 | Lower RDMA Remote Memory Virtual Address | | | |
| 7 | Data Length | | | |
| 8-n | Unused | | | |

Figure 15 – Vito-FC RCP_RESP IU Updates

SCSI Fibre Channel Protocol FCP_RESP Information Unit

| Word | Byte 0 | Byte 1 | Byte 2 | Byte 3 | |
|---|---|---|---|---|---|
| 0 | | | | | reserved |
| 1 | | | | | |
| 2 | reserved | reserved | Validity Flags | SCSI Status Bytes | FCP_STATUS |
| 3 | | | | | FCP_RESID |
| 4 | (length of PCP_SNS_INFO in bytes) | | | | FCP_SNS_LEN |
| 5 | (0, 4 or 8 bytes per FCP) | | | | FCP_RSP_LEN |
| 6 | reserved | reserved | reserved | RSP_CODE | FCP_RSP_INFO |
| 7 | reserved | reserved | reserved | reserved | |
| 8-n | (variable length as defined by the FCP_SNS_LEN) | | | | FCP_SNS_INFO |

Vito over SCSI Fibre Channel Protocol FCP_RESP Information Unit

| Word | Byte 0 | Byte 1 | Byte 2 | Byte 3 |
|---|---|---|---|---|
| 0 | | | | |
| 1 | | | | |
| 2 | reserved | reserved | Validity Flags | SCSI Status Byte |
| 3 | | | | |
| 4 | (0=Good FCP_RESP and 8=Bad FCP_RESP) | | | |
| 5 | (0=Good FCP_RESP and 8=Bad FCP_Resp) | | | |
| 6 | Reserved | reserved | reserved | RSP_CODE |
| 7 | reserved | reserved | reserved | reserved |
| 8-n | VI Status Code | | | |

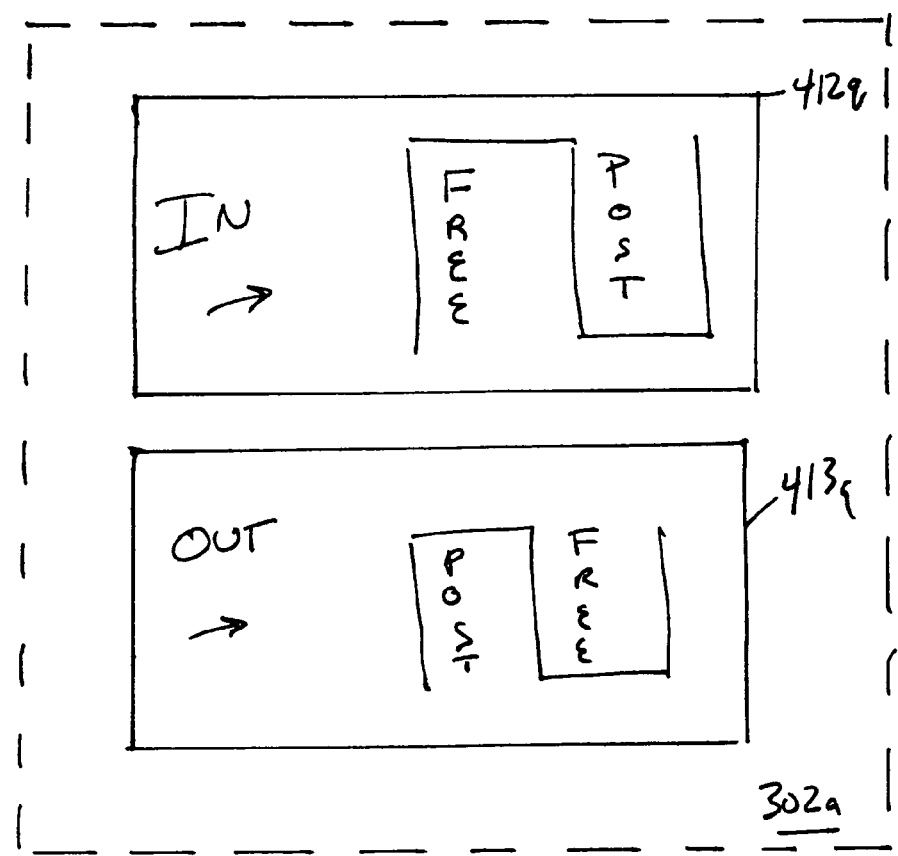

Figure 17
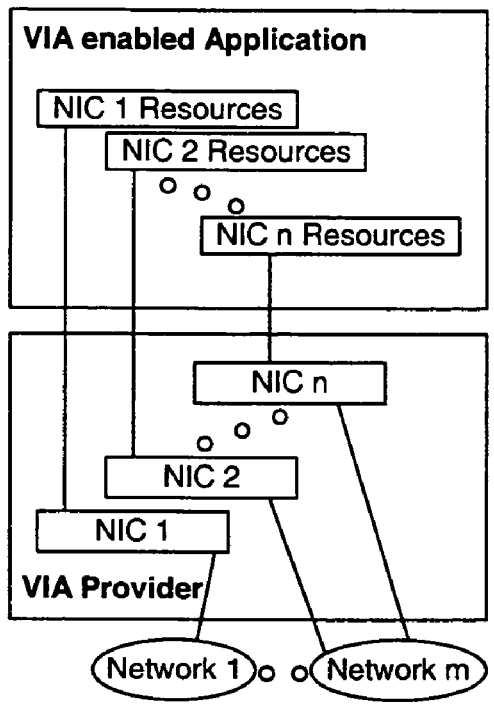
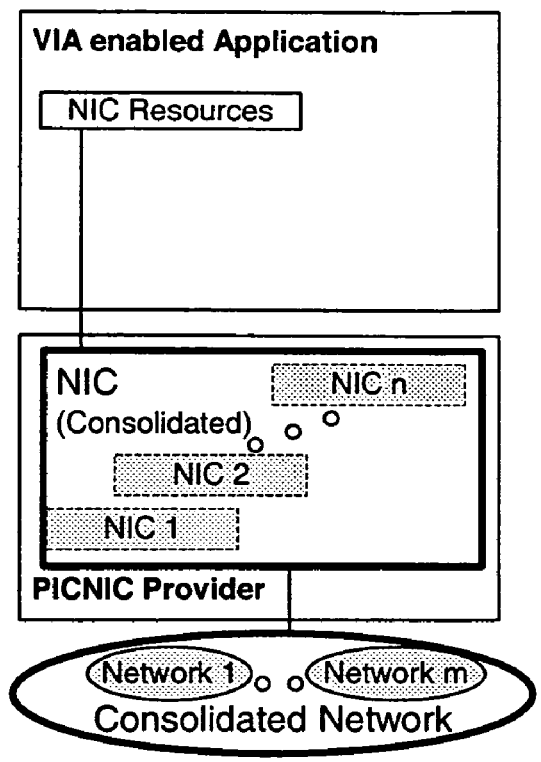

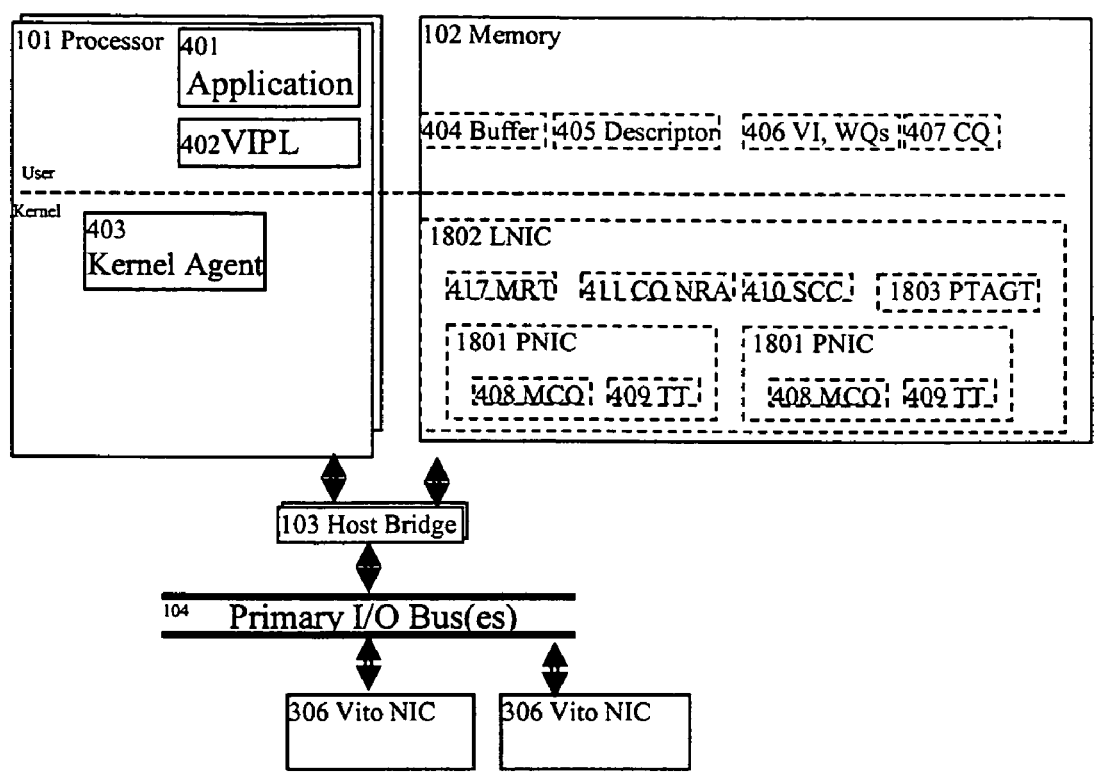
Figure 18 – PICNIC Data Structures

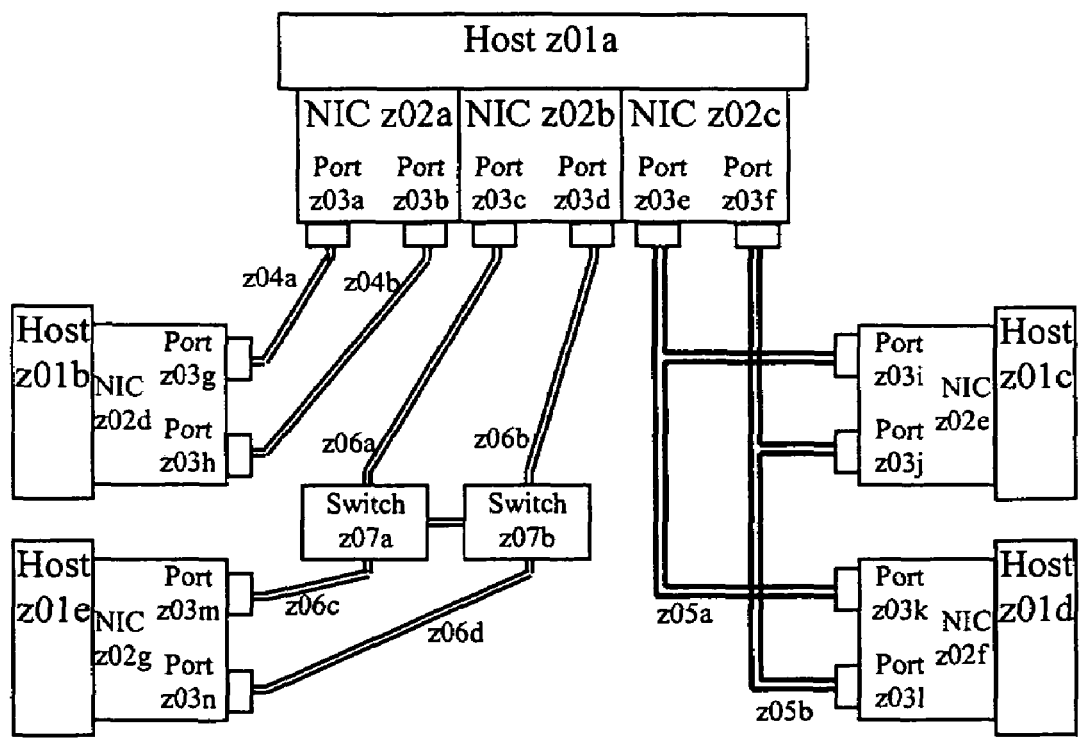
Figure 19 – Possible Link Configurations

Figure 20 – Example Paths

| Host | | z01a | | | | | | z01b | | z01c | | z01d | | z01e | |
|---|---|---|---|---|---|---|---|---|---|---|---|---|---|---|---|
| | Port | z03a | z03b | z03c | z03d | z03e | z03f | z03g | z03h | z03i | z03j | z03k | z03l | z03m | z03n |
| z01a | z03a | Lb | | | | | | z04a | | | | | | | |
| | z03b | | Lb | | | | | | z04b | | | | | | |
| | z03c | | | Lb | z06a; z07a; z07b; z06b | | | | | | | | | z06a; z07a; z06c | z06a; z07a; z07b; z06d |
| | z03d | | | z06b; z07b; z07a; z06a | Lb | | | | | | | | | z06b; z07b; z07a; z06c | z06b; z07b; z07a; z06d |
| | z03e | | | | | Lb | | | | z05a | | z05a | | | |
| | z03f | | | | | | Lb | | | | z05b | | z05b | | |
| z01b | z03g | z04a | | | | | | Lb | | | | | | | |
| | z03h | | z04b | | | | | | Lb | | | | | | |
| z01c | z03i | | | | | z05a | | | | Lb | | | | | |
| | z03j | | | | | | z05b | | | | Lb | | | | |
| z01d | z03k | | | | | z05a | | | | | | Lb | | | |
| | z03l | | | | | | z05b | | | | | | Lb | | |
| z01e | z03m | | | z06c; z07a; z06a | z06c; z07a; z07b; z06b | | | | | | | | | Lb | z06c; z07a; z07b; z06d |
| | z03n | | | z06d; z07b; z07a; z06a | z06d; z07b; z07a; z06b | | | | | | | | | z06d; z07b; z07a; z06c | Lb |

OPTIMIZING VIRTUAL INTERFACE ARCHITECTURE (VIA) ON MULTIPROCESSOR SERVERS AND PHYSICALLY INDEPENDENT CONSOLIDATED NICS

RELATED APPLICATIONS

This application is filed on even date with additional applications U.S. Ser. No. 10/728,470 which share much common disclosure herewith and have substantially identical specifications. Accordingly said application Ser. No. 10/729,312 are incorporated hereinto by this reference in its entirety for consistency.

BACKGROUND

The Virtual Interface Architecture (VIA) provides a high-speed, low-latency, low-overhead method of cluster communications between computer systems. Although a standard VIA to Fibre Channel mapping protocol has been defined, it can not be implemented efficiently using off-the-shelf Fibre Channel controllers. The invention described herein is a more general VIA to Small Computer System Interface (SCSI) mapping which can be implemented very efficiently using SCSI media controllers (such as Fibre Channel).

The usual method of interconnecting clustered servers is over a TCP/IP network, typically on an Ethernet network. Although the performance of the underlying Ethernet technology has steadily progressed over the years, the host-resident TCP/IP protocol stack has remained a bottleneck to overall system performance. On multi-processor systems, this bottleneck becomes particularly apparent when the protocol stack contains single-threaded critical sections.

In addition to multi-processor contention, the simple overhead of handling the much higher volume of packets delivered by higher-speed networks like gigabit ethernet consumes a higher percentage of the host's processing power.

A significant benefit, measured in host processor utilization can be realized by using a non-TCP/IP clustering protocol which is non-contentious and utilizes intelligent network interface cards (NICs) acting as offload engines.

The Virtual Interface Architecture (VIA), developed by Intel and Compaq, is just such a clustering technology. VIA is an API (Application Program Interface) and processing model that allows user applications to issue commands directly to the NICs, without any operating system intervention.

However this is not available to many computer systems without substantial overhead, much of which is reduced or eliminated using our approach which includes an adaptation of the VIA semantics to SCSI and, preferably, an improvement to the VIA for use in multiprocessor servers.

Many people in this field are aware of the VIA's features however we feel it useful to mention several of them which we consider of key importance.

Virtual hardware: The NIC hardware is mapped into each application's virtual memory, thereby giving each application its own virtual set of hardware. (NIC stands for Network Interface Card, a commonly used term for a card providing interface to either components, data storage devices or networks through which data communications can occur from a host computer system to one of those things to which the NIC is connected. Communications through such a card to something it is connected to can be called communications between an application on a host computer and a "destination".) The various VIA objects, some of which are shared between the application and the NICs, are also mapped directly into the application's memory space. These objects include virtual interfaces (VIs), which are communication endpoints comprising send and receive work queues, and completion queues (CQs), which allow completion notifications from multiple VIs to be aggregated and serviced together.

Another "virtual" aspect of VIA is the use of user-level virtual addresses by the hardware and by partner applications. When an application issues a command to the NIC, it uses its own virtual addresses for referencing buffers and descriptors. (A "descriptor" is something defined in the VIA specification which holds all the information needed to perform an operation). Likewise, an application can publish its virtual addresses to its partner at the other end of the VI, and that partner application can then read from and write to those buffers directly via Remote Direct Memory Addressing (RDMA) operations.

To accomplish this use of virtual addresses, the memory regions must be registered with the hardware. Registration pins the referenced pages in memory so they can not be moved, and resolves the physical address of each page. The registration information is made available to the hardware so it can access the memory directly.

To accomplish the direct access of the NIC hardware by user applications, a descriptor format is defined by the VIA API. A single descriptor is used to issue commands referencing very large, scattered/gathered data regions, and to store the resulting status.

Four operations are defined by the architecture: Send, Receive, RDMA-Write, and RDMA-Read. Each send operation consumes exactly one receive descriptor at the other end of the VI. RDMA operations allow applications to share memory regions for read and/or write access.

Each VI endpoint is represented by a pair of work queues. One queue is used to post Send operations to the hardware, and the other is for Receives. Applications can wait for a posted descriptor on either work queue to complete, or they can poll the status of the descriptor at the head of each queue.

Work queues may also be associated with a Completion Queue (CQ), on which completion notifications from multiple VIs' work queues can be aggregated. Applications can wait on CQs, which effectively waits on any of its associated work queues.

Three reliability levels are specified by the VIA specification. Applications can specify a reliability level on a per-VI basis. Reliability levels are: Reliable-Transmission, which guarantees the data will be transmitted; Reliable-Reception, which guarantees that the data is received by the remote side; and Reliable-Delivery, which says that the partner application is notified of the message reception.

There are other VIA implementations including the Giganet cLan and the QLogic FC-VI, but they have their own limitations. Particularly, the Giganet clan is ATM (Asynchronous Transfer Mode)-based, and is rather slow and it is a technology that is therefore near the end of its useful existence. The QLogic FC-VI is a simple FC (Fiber Channel) mapping protocol. It uses all single-frame sequences and does not take advantage of current commodity FC controllers' capabilities, such as hardware acceleration of some protocols, including SCSI FCP. It also requires microcode-able or custom hardware in order to perform adequately.

BRIEF DESCRIPTION OF THE DRAWINGS

FIG. 1 is a block diagram illustration of the main relevant components of prior art hardware architecture for a typical server.

FIG. 2 is a block diagram illustration similar to that of FIG. 1 but with greater detail in the NIC area.

FIG. 3 is a block diagram illustration of the VITO NIC architecture of a preferred embodiment of the invention.

FIG. 4 is a block diagram illustration of the VITO NIC software architecture of a preferred embodiment of the invention detailing relevant software modules.

FIG. 5 is a flow chart of the Memory Registration message flows in accord with preferred embodiments of the invention.

FIG. 6 is a flow chart of the descriptor posting message flows in accord with preferred embodiments of the invention.

FIG. 7 is a flow diagram illustrating the message (MSG) unit descriptor processing message flows in a preferred embodiment.

FIG. 8 is a flow diagram illustrating the Send Processing message flows in a preferred embodiment.

FIG. 9 is a flow diagram illustrating the RDMA-Write processing message flows in a preferred embodiment.

FIG. 10 is a flow diagram illustrating the RDMA-Read processing message flows in a preferred embodiment.

FIG. 11 is a flow diagram illustrating the Work Queue completion notification message flows in a preferred embodiment.

FIG. 12 is a flow diagram illustrating the Completion Queue completion notification message flows in a preferred embodiment. It is split across two sheets and referenced as FIGS. 12.1 and 21.2.

FIG. 13 is a flow diagram illustrating the memory deregistration message flows in accord with preferred embodiments of the invention.

FIG. 14 is a data chart comparing the SCSI Fibre Channel Protocol FCP_CMD Information Unit to the Vito over SCSI Fibre Channel Protocol FCP_CMD Information Unit.

FIG. 15 is a data chart comparing the SCSI Fibre Channel Protocol FCP_RESP Information Unit to the Vito over SCSI Fibre Channel Protocol FCP_RESP Information Unit.

FIG. 16 is a block diagram of a preferred embodiment I/O bridge detailing its relevant FIFO queues.

FIG. 17 is a block diagram comparing an old NIC connection architecture with the inventive one described herein.

FIG. 18 is a block diagram illustrating the PICNIC data structures for comparison to the data structures of the preferred Vito implementation of FIG. 4.

FIG. 19 is a block diagram illustrating possible connections between ports in a system which could employ the invention.

FIG. 20 is a table of ports and connections for the ports of FIG. 19.

SUMMARY OF THE INVENTION

We have implemented a VIA provider we call VI-to-Fibre Channel (Vito-FC, or "Vito" or sometimes "VITO"). A VIA provider is a combination of hardware and software which implements the VIA semantics detailed by the VIA specifications. Vito is a complete implementation of the VIA 1.0 specification (available through license from Intel Corporation) which employs a host bus adapter Network Interface Card (NIC) for communicating data between an application in a computer system and peripherals, system area networks, other computer systems, other networks or the like. In our preferred embodiments the NIC is a proprietary Fibre Channel host bus adapter (HBA) card which we call IntelliFibre (TM Unisys Corporation). We use the proprietary HBA because it has some enhancements well suited to our systems, but other HBA-type NICs could be used to implement the invention. Vito is tailored for large multi-processor environments, such as the ES7000, where it provides best-in-class normalized performance, in other words it can provide the highest message rate at a given host CPU (central processing unit) utilization, or the lowest host CPU utilization at a given message rate.

The Vito provider we describe herein is fully Fibre Channel compliant, and interacts with current off-the-shelf equipment such as switches and hubs. It does not concurrently provide VIA and storage HBA functionality, although it could be modified to do so by merging what is now two separate firmware sets. (The ANSI working group X3T111 defines the Fibre Channel specifications.)

The particulars of the features of our system can be summarized in groupings or sub-summaries. The first, a sub-summary of Virtual Interface Architecture (VIA) Semantics Over Small Computer Systems Interconnect supporting with Port Aggregation(SCSI) is an aspect that defines a method and system for accomplishing communications between an application on a host computer system and its data stores and/or networks, facilitating in the process aggregation of ports and enhancing available throughput while providing additional resiliency. This aspect of the preferred embodiments is applicable to many if not all of the serial SCSI technologies, including at least, for example, SAS, SATA, USB, and Fibre FCP. Also, using SCSI commands allows us to take advantage of the ability to use off the shelf SCSI hardware controllers to segment and reintegrate large frames, using the scatter/gather hardware enabled commands inherent in such controllers.

Another set of innovative features we describe as intelligent NIC optimizations. These include system and methods for Token Table Posting, use of a Master Completion Queue, NRA in NIC, and what we call Lazy Memory Deregistration which allows non-critical memory deregistration processing to occur during non-busy times. These intelligent NIC optimizations which could be applicable outside the scope of VIA (e.g. iWARP and the like), but also support VIA.

Finally, we optimize the Virtual Interface Architecture (VIA) on Multiprocessor Servers using Physically Independent Consolidated NICs.

Many additional details are described within.

DETAILED DESCRIPTION OF THE PREFERRED EMBODIMENTS

The hardware and software architectures to implement the preferred embodiments is first described. Generally we can look at the extant art of relevance with reference to FIGS. 1 and 2.

In FIG. 1 the typical server hardware architecture is depicted. One or more processors (101) are connected to one or more host bridges (103), which provide access to memories (102) and I/O. Connected to the primary I/O busses (104) to provide I/O to the system 99, are NICs (105), and HBAs (Host Bus Adapters) (not shown).

FIG. 2 shows the same system as FIG. 1 but here it is numbered 99a, however this Fig. also expands the features shown of NIC component of FIG. 1, showing its architecture in the portion of the block diagram that is on Network Interface Card block 105 NIC. The NIC architecture mimics that of the host in that there is a processor 201 (typically only one, although more could be supported); an I/O bridge 202, similar to the host bridge; memory 203; one or more I/O busses 204 (only one shown); and one or more media controllers 205. The I/O bridge 202 not only connects the processor and memory to the secondary I/O busses, but also allows the processor and media controllers access to host memory. Its computer system 99*b* will be found to be nearly identical having a processor 101*a*, memory 102*a*, host bridge 103*a* and primary I/O busses 104*a*.

FIG. 3 illustrates a similar hardware architecture to support the inventive features of this invention. The computer system 99*c* will be found to be nearly identical having a processor 101*b*, memory 102*b*, host bridge 103*b* and primary I/O busses 104*b*. The Vito NIC (306 Vito NIC) has an architecture similar to the prior art 105 NIC card with parallel similarity to the host computer system; having a processor or processors 301, an I/O bridge 302, similar to the host bridge; memory 303; one or more I/O busses 304 (only one shown); and one or more media controllers 305*a* and *b*. The processor in our preferred NIC card is a MIPS instruction set processor and the I/O bridge is a Galileo 64120A system-on-chip for embedded devices. (Other SOC's could be substituted assuming compatibility with the I/O and the chosen processors). The secondary I/O bus in our preferred NIC card is a Peripheral-Computer Interface (PCI) bus, and two Agilent XL2 controllers are included. Each XL2 controller supports the Small Computer System Interface (SCSI) Fibre Channel Protocol (FCP) over a 2 gigabit-per-second Fibre Channel link.

The software modules shown in FIG. 4 are described below. Note that environmental software such as the host operating system, the NIC run-time support, and the XL2 low-level drivers are not shown or discussed. However, the relevant software programs are shown on the Processor space 101*d* and the data structures on the memory space 102*d*. Also, the Kernel-related items are below the line between the "User" and "Kernel" operated sections in the processor and in the memory spaces.

Application 401 is one or more User applications. These could be programs like SQL Server. This architecture and other features described herein work particularly well for clustered applications where latency is a critical or important issue.

There is also the VIPL, VIA Provider Library 402, which is the user-level library which makes transparent the details of the VIA implementation from the application. VIPL supports the VIA 1.0 API. The Kernel Agent 403 is a Kernel-mode component (of the Operating System) which performs operations which must be implemented with operating system privileges for control and management functions, such as hardware initialization, memory registration, interrupt servicing, and the like. The Kernel Agent is not concerned with data path use.

Other software program components of use in the inventive system include the RCM 414, which is a Registration and Control Module that as a NIC component handles control functions such as initialization, memory registration, dumping, VI state management, and the functions of a similar nature. The Msg Unit 415, a Messaging Unit, is the software component found on the NIC which handles low-level communications between the host and the NIC. Vito is loosely based on the I$^2$O (known as Intelligent I/O, a messaging model adopted by Intel and Galileo, companies which both make I/O bridges) messaging model, which includes two hardware FIFO pairs within the Galileo I/O Bridge. Each I$^2$O FIFO pair (and these are used in our preferred embodiments) consists of a "post" FIFO and a "free" FIFO. The post FIFO queues (preferably) 32-bit messages, and can be programmed to interrupt the receiver when the queue transitions from empty to non-empty. The free FIFO queues 32-bit messages in the opposite direction, and does not interrupt the receiver (which is the sender relative to the post FIFO). The post FIFOs typically are used to issue commands or notifications, while the free FIFOs can be used for non-timely messages, such as flow-control notifications.

There are two of these FIFO pairs in the Galileo chip 302*a*; the In FIFO 412*q* and the Out FIFO 413*q*, which can be seen in more detail in FIG. 16. The post side of the In FIFO is used by Vito to deliver completion notifications and control command responses, and it generates interrupts to the sender. The free side is not used. The post side of the Out FIFO is used by the host software to deliver notifications that control commands and posted descriptors are ready to be processed by the NIC. To do so it generates an interrupt to the host. The free side of the Out FIFO is used in one design as a flow-control mechanism to ensure that the post side is not overrun.

Vito Protocol, that is, Vito-FC protocol module 416, implements the Vito protocol for many simultaneous dialogs. It programs the XL2 chips to use protocol coding in message and flow dialogues for SEND, RDMA READ and RDMA WRITE, operations which are defined in the VIA specification. Note, the Vito Protocol is a software module, executed by the MIPS processor, on the NIC (which is sometimes referred to as the FCIOP or FC I/O processor) that is responsible for generating the Vito over SCSI Fibre Channel Protocol Information Units (FCP_CMD, FCP_XFER_RDY and FCP_RESP).

Data Structures

There are several data structures used in the implementation of Vito. FIG. 4 shows the key ones, many of which are shared between the host software and the NIC. Use of these is described in some detail later, but we believe it is easier to understand how this works if we name the structures first.

A Buffer, User-allocated data buffer 404 is used by the user programs. Descriptor 405 is a VIA-defined data structure that contains command information, scatter/gather segment descriptions, and status.

VI 406 is a VIPL-allocated data structure containing the VI state, including the Send Work Queue (WQ) 406.1 and Receive Work Queue 406.2.

The CQ or Completion Queue, 407 is shared between VIPL and Kernel Agent.

MCQ, the Master CQ 408 exists as one MCQ per NIC. The MCQ 408 is where the NIC stores the completion status of descriptors (405) posted to work queues which are associated with a CQ.

The TT or Token Table 409 is a per-NIC structure in host memory used to communicate descriptors and control-path commands to the NIC. The TT has different forms based on the overall design but generally will contain the following fields:

The first one is called a Last_Inserted_Entry 409.1, an atomically incremented counter which, when moduloed by an arbitrary constant we call "MAX_TOKENS," which defines the size of the Post_Array 409.3. This yields an index indicating where in the Post_Array 409.3 the descriptor being posted should be inserted. This index becomes the descriptor's number, and is also stored in the Post_Array 409.3 entry holding the newly posted descriptor.

Last_Accepted_Entry 409.2 is a counter which, when moduloed by MAX_TOKENS, yields an index into the Post_Array 409.3 which indicates the last entry which has been transferred to the NIC.

Post_Array 409.3 is an array whose entries may contain either a compressed descriptor or a control-path command.

(Each entry is preferably aligned on a cache-line boundary to avoid thrashing of cache-lines between caches on multiprocessor systems) Each entry contains the following fields:

- Descriptor_Number 409.3.1 is the unmoduloed value of Last_Inserted Entry for this descriptor/command.
- VI_Number 409.3.2 indicates which VI the descriptor is associated with.
- Form of entry 409.3.3 indicates whether this Post_Array entry is a compressed descriptor or a control-path command.
- Control_Field 409.3.4 is comprised of relevant bits from the descriptor's control field.
- which_Queue 409.3.5 indicates whether descriptor is posted to a Send or Receive WQ (Work Queue).
- Seg_Count 409.3.6 is the number of data segments in the descriptor.
- Desc_HLV 409.3.7 is the memory Handle/Length/Virtual address (HLV) of the descriptor.
- Data_HLVs 409.3.8 is an array of MAX_LOCAL_DATA_SEGMENTS of data segment HLVs. If Seg_Count's value is greater than MAX_LOCAL_DATA_SEGMENTS, Data_HLVs is ignored. Data_HLVs is used to optimize the transfer of descriptor information from the host memory 102 to the NIC for processing, such that only one DMA is required if the number of data segments, Seg_Count 409.3.6, in the descriptor is less-than-or-equal-to MAX_LOCAL_DATA_SEGMENTS.

The data structures also include a SCC 410, or Send Completion Counter, which is a data word in host memory that is updated by the Vito Protocol to indicate to the VIPL how many send descriptors have completed (i.e. been executed or handled by the NIC). There is a unique SCC for each active VI.

CQ 411, is a Completion Queue Notification Request Area, a data word in host memory that is incremented by the VIPL when a user thread waits on the CQ and there are no completed descriptors to return. There is a unique CQ NRA (Notification Request Area) for each active CQ. Incrementing the CQ NRA tells the Kernel Agent that a thread is waiting, and the Kernel Agent should awaken the thread, via some operating system-specific mechanism, when the next descriptor completes.

MRT 417, are the Memory Region Tables are tables maintained by the Kernel Agent, but shared between the Kernel Agent and the RCM 414. MRTs allow the Vito Protocol to program the XL2 controllers (or their equivalent) to enable the XL2 controllers to directly access user buffers 404.

IORB 418, the I/O Request Block is a data structure shared by the Message Unit 415 and the Vito Protocol block 416 and which contains information specifying an I/O operation and its status.

MRT$^2$ 419 is a shadow copy of the host-resident MRT 417. It is maintained in NIC memory used as a cache by the Vito Protocol.

WQ NRA 420 is the Work Queue Notification Request Area. It is a word located in NIC memory 303a, associated with a particular Send WQ 406.1 or Receive WQ 406.2, which the VIPL 402 increments when a user thread waits on the associated WQ and there are no completed descriptors to return. Incrementing the WQ NRA 420 tells the Vito Protocol block 416 to notify the host software when the next descriptor completes on the WQ.

MDL 421, Memory Deregistration List is a list in NIC memory 302a to which the Kernel Agent 403 adds memory handles when the user application calls the VIPL function VipDeregisterMem( ). The RCM 414 processes the MDL 421 as described in the Memory Deregistration section of this document, below.

The basic functions of a fully operational system in accord with preferred embodiments of this invention will now be described.

First we describe memory registration and deregistration functions in the preferred embodiments with reference to FIG. 5 in which the process of memory registration message flows are illustrated. The agents are the user application 401, VIPL 402, and the Kernel agent 403, and the data blocks are User Data which could be in Buffer 404, and KA data (Kernel Agent data). User applications register and deregister memory regions (buffers and descriptors) via VIPL functions named VipRegisterMem( ) and VipDeregisterMem( ).

If the user calls VipRegisterMem( ) 504, data describing the User Data memory region 404a, such as its virtual address and length is transferred by the User Application to the VIPL. Here an IoctlRegisterMem(MR, . . . ) 505 is formed to call the Kernel Agent with the data passed to VipRegisterMem( ). The Kernel agent allocates at step 506, an MRT 502 table entry in its data area. In the next step 507, the region information (virtual address, length, protection tag, etc. as described in the VIA specification) is stored in that entry. Then the Kernel Agent calls the OS at step 508 to load all of the memory pages in the memory region 404a into physical memory and to resolve their physical addresses, storing those addresses in a Page Address List (PAL) 504. Then the Kernel Agent determines if the region (defined in step 507) spans less than or equal to the maximum allowed local page numbers (MAX_LOCAL_DATA_SEGMENTS), and if so it copies the PAL into the MRT entry in a step 510. If the region spans more than MAX_LOCAL_DATA_SEGMENTS, then in a next step 511 an indirect reference to the PAL is stored in the MRT. The preset value of MAX_LOCAL_DATA_SEGMENTS is an optimization turning parameter that is constrained by the following criteria: 1) each MRT entry should be cache-line aligned to avoid cache-line thrashing; 2) the MRT should be large enough to hold a "typical" region; 3) the MRT should not be so big that excessive time is wasted transferring unused local data segment slots. The index of the MRT entry is returned in step 512 to the VIPL. That MRT index is then returned in step 513 to the user application as the memory handle.

As mentioned previously VIA descriptors are used in our system. These are the means for the host software and NIC software to exchange commands and results. Two functions are used to implement this, and they are called when a user application issues a command to the NIC. They are called VipPostSend( ) and VipPostReceive( ). The processing sequence for handling these functions' message flows is described with reference to FIG. 6.

First, the user application calls 603 the function it wants (VipPostSend( ) or VipPostReceive( ). This call is made to the VIPL (VIA Provider Library 402), which causes an atomic increment 606 of the Last_Inserted_Entry 409.1 of the_Token Table 409 of the Kernel Agent.

The VIPL before doing this first validates 604 the descriptor's contents as having:
- a valid descriptor, that is, reserved fields, and optype (operator type),
- determines that total data segment lengths do not exceed length in control field,
- determines that Queue state valid,
- determines that the segment count does not exceed maximum per descriptor,
- determines that the optype is on the correct queue, determines that the RDMA-R on reliability level greater than unreliable, and determines that the total segment lengths do not exceed maximum transfer size.

The VIPL then links 605 the descriptor onto the appropriate WQ.

Step 606 is atomically increments Last_Inserted_Entry, the result of which is stored in Local_Insert, then moduloed by MAX_TOKENS and that result stored locally in Local_Insert_Index.

If the Token Table is full, query 607, the system must wait until there is room 608. Then the Descriptor 405*a* can be fetched and used to fill in VI_Number, Form, Control_Field, Which_Queue field, Seg_Count, and Desc_HLV, and Descriptor_Number fields of the Token Table's Post_Array [Local_Insert_Index] field, making sure Descriptor_Number is updated last, thus completing step 609. We prefer to determine if the number of segments are equal to MAX_LOCAL_DATA_SEGMENTS or fewer data segments in the descriptor (610). If there are MAX_LOCAL_DATA_SEGMENTS or fewer data segments, in step 611 we copy Data_HLVs[ ] entries, the number of which is indicated by Seg_Count from the descriptor's data segments. Determine in step 612 if this is the first unaccepted Post_Array entry (i.e, is TT.Last_Inserted_Entry==(TT.Last_Accepted_Entry+1))? If it is, the VIPL writes 613 a new-entry-posted notification to the Out Post FIFO.

Having posted the descriptor to the Token Table, it must be processed by the NIC software. The Vito Protocol processing is different for each of the four descriptor types (Receive, Send, RDMA-Write, RDMA-Read). The Msg Unit, in the preferred embodiment, processes all descriptor Token Table entries the same way. Control commands are also delivered to the NIC software via the Token Table. Control command processing is outside of the scope of this application.

The Msg Unit is invoked in the preferred embodiments either by an interrupt generated by the Galileo bridge when the Out Post FIFO goes to a status of non-empty, or by procedure call to poll for newly inserted TT Post_Array entries. In either case, the processing proceeds as illustrated in FIG. 7.

FIG. 7 has several variables at play. The first, MU_Last_Accepted_Entry 710 is a global variable in the NIC which indicates the descriptor number of the last TT Post_Array entry that was retrieved from the host-resident TT of the Kernel Agent. A second Num_Copy_TT_Entries 702*a* is a MU-global variable indicating how many Post_Array entries should be retrieved in a batch. A third, MU_TT_Poll_Interval 702*b* is a MU-global variable indicating the time interval between successive MU invocations which poll Post_Array for newly posted entries. If a latency-sensitive load is detected, this variable is set to zero to disable polling. New-entry-posted notifications are then requested after all posted entries have been processed.

What FIG. 7 basically details is the primary Do loop of the Msg Unit, which is set up by the interrupt 613*a* in order to handle Msg Unit descriptor processing:

Do loop 703
    Copy Num__704; Copy__TT__Entries from TT.Post__Array;
    For each copied entry that is new (.Descriptor__Number>
    MU__Last__Accepted__Entry) Do loop 705:
        Determine: Does this entry contain a descriptor? (query 706)
          (Assuming yes) Fetch 707 memory registration information
        for region containing descriptor from MRT 417 and store -continued that information in the shadow copy $MRT^2$ 419;
Does this entry contain an indirect descriptor reference
    (.Seg__Count > MAX__LOCAL__DATA__SEGMENTS)? 708
        then Copy 709 the descriptor from user memory;
    Build 710 an IORB (I/O Resource Block?)that represents
    this descriptor;
    Call 711 Vito Protocol, passing IORB;
If No, the entry is a control command:
    <Out of scope>
    712Increment 712 MU__Last__Accepted__Entry;
Continue the Do loop 703 Until the last copied entry is old (i.e.,
.Descriptor__Number <=MU__Last__Accepted__Entry);

Adjust the Num_Copy_TT_Entries based on measured load 714. (If only one or a few Post_Array entries are valid each time a group is copied, reduce Num_Copy_TT_Entries to avoid wasting time and system resources used to copy old entries. Likewise, Num_Copy_TT_Entries can be increased if multiple copy operations must be performed consecutively to retrieve all of the new Post_Array entries);

Adjust MU_Poll_TT_Interval based on measured load 715 (If only one or a few Post_Array entries are valid, most likely the user application is transaction-oriented, and therefore latency-sensitive. In this case, MU_Poll_TT_Interval should preferably be reduced to zero, responsive to this information. On the other hand, if many valid Post_Array entries are retrieved, we believe it is most likely the user application is throughput-sensitive. So, to avoid unnecessary host memory updates and NIC interrupts due to new-entry-posted notifications, MU_Poll_TT_Interval preferably would be set to non-zero and an interval timer started which upon expiration will call the Msg Unit to retrieve more Post_Array entries;

Is MU_Poll_TT_Interval=0, or did we process no new Post_Array entries in this invocation? (716)

Update 717 TT.Last_Accepted_Entry with MU_Last_Accepted_Entry;

Copy 718 TT.Last_Inserted_Entry to be sure a new entry was not being inserted while TT.Last_Accepted_Entry was being updated;

Receive Descriptors are processed in a relatively simple manner requiring only two steps from the Vito Protocol. The VIA specification states that receive descriptors must be posted before send descriptors which will consume them are posted by the partner application. For each send descriptor posted, exactly one receive descriptor is consumed. If there is no receive descriptor posted by the receiving application prior to the sender posting its send descriptor, an error will be generated. Receive descriptors may also be consumed by RDMA-Write operations which pass immediate data. The Vito Protocol's processing of receive descriptors when they are posted is as follows:

Vito Protocol (IORB passed by Msg Unit):
    Fetch the registration information for each of the referenced memory regions, storing that info in the IORB;
    Queue the IORB on the appropriate VI's receive queue;

Vito Protocol send descriptor processing is a bit more complex and is therefore illustrated in FIG. 8 which details the send processing message flows. Note that the Sending XL2 and the Receiving XL2 and their supporting architectural component processes (Vito protocol, MSG unit, KA and Application) could be on the same computer or on different ones communicating across a SAN (Storage Area Network) or other network. The two communicating XL2's could even be on the same NIC, or it could even be a single XL2 in loop-back mode to which this invention could apply.

In FIG. 8 there are several important Data Items:
- IORB (I/O Request Block) 418*a* is a NIC-resident data structure which contains all necessary information to process an I/O.
- XL2 SGL (scatter/gather list) 802 is a data structure used by the XL2 hardware to gather transmit data from multiple memory extents, or to scatter received data to multiple memory extents.
- LSB (Local Status Buffer) 803 is a NIC-resident data structure containing descriptor status fields which is used to update the receive descriptor's status fields automatically by the XL2.

The process for sending in Vito Protocol (i.e., the IORB is passed by Msg Unit, called by step 711) occurs as follows:
- The IORB is queued 805 on the appropriate VI's send queue;
- Query 806, Is this the first IORB on the send queue?
  - Build 807 an XL2 scatter/gather list (SGL) 802*a* using the registration information to send data directly from the user application's buffers, the immediate data (if indicated) from the user's descriptor, and also a Local Status Buffer (LSB) containing descriptor status information indicating success and the data transfer length;
  - Build and start 808 an XL2 SCSI FCP CMND I/O containing a Vito Send command;

Receiving Vito Protocol (SCSI FCP VIA Send command received):
- To accomplish this we first check in query 809, "Are all of these (following) criteria valid?"
  - The VI is still open,
  - There is a receive IORB queued,
  - The receive IORB describes a scatter list large enough to hold the data being sent,
  - The memory handles in the IORB are still valid,
    - If so, we . . . . Dequeue 810 the first IORB from the receive queue;
    - Build 811 an XL2 scatter/gather list (SGL) 802*b* using the registration information in order to receive data directly into the user application's buffers, and to receive status, immediate data (if indicated), and data transfer length directly into the application's descriptor;
    - Build and start 812 an XL2 SCSI FCP XFER_RDY I/O (this XL2 XFER_RDY message is defined in the SCSI FCP specification, it is accomplished by the receiving Vito Protocol);
  - No, one of the conditions is not met so there is an error:
    - Build and return 813 a SCSI Error Response with the appropriate VIA Send result code;

To handle this, one of the XL2s:
- Perform a SCSI FCP data transfer 819 of sending data buffer, immediate data (if indicated) from sending descriptor, and status and length from LSB (Local Status Buffer) into the receiving data buffer and receiving descriptor;

Receiving Vito Protocol (SCSI FCP XFER_RDY complete) uses the following steps in our preferred embodiments:
- Build and start 814 an XL2 SCSI RCP RESP I/O indicating success;
- Free 815 the SGL, etc. (not the IORB) associated with this I/O;
- Call 816 Msg Unit, passing the IORB, for completion notification processing;

Sending Vito Protocol (Vito Send response received) uses these two steps:
- Free 817 the SGL, and any local data structures other than the IORB) associated with this I/O;
- Call 818 Msg Unit, passing the IORB, for completion notification processing;

RDMA-Write operation processing is very similar to Send processing except that no receive descriptor is consumed if there is no immediate data sent. RDMA-Write processing message flow is illustrated in FIG. 9.

Again, there are specific data items and steps and queries to accomplish these operations.

Data Items:
- IORB (I/O Request Block) 418*a* is a NIC-resident data structure which contains all necessary information to process an I/O.
- XL2 SGL (scatter/gather list) 802*c* and 802*d* are data structures used by the XL2 hardware to gather transmit data from multiple memory extents, or to scatter received data to multiple memory extents. (A memory "extent" is simply a logically contiguous area of memory defined, preferably by a start address and a length.)
- LSB (Local Status Buffer) 803*a* is a NIC-resident data structure containing descriptor status fields which is used to update the receive descriptor's status fields automatically by the XL2.

Sending Vito Protocol (IORB passed by Msg Unit):
- Queue the IORB 905 on the appropriate VI's send queue;
- Is this the first IORB on the send queue? (query 906). If not, just leave the IORB on the Queue, otherwise:
  - Build 907 an XL2 scatter/gather list (SGL) using the registration information to send data directly from the user application's buffers, and if immediate data is indicated: the immediate data from the user's descriptor, and length and status indicating success from a LSB. If immediate data is not indicated, no status is transferred;
  - Build 908 and start an XL2 SCSI FCP CMND I/O containing a Vito RDMA-Write command and the target memory region;

Receiving Vito Protocol (SCSI FCP VIA RDMA-Write command received):
- Query 909. Are all of these criteria valid?:
  - The VI is still open,
  - VI has RDMA-W capability enabled,
  - VI and memory region protection tags match,
  - Memory region has RDMA-W enabled,
  - If immediate data is specified and there is a receive IORB queued,
    - If valid, Dequeue 910 the first IORB from the receive queue;
  - If No, there is an error:
    - Build and return 911 a SCSI Error Response with the appropriate VIA Send result code;
    - Return to the interrupt handler;
- Fetch 920 the memory registration information for the target memory region indicated in the command;
- Build 913 an XL2 scatter/gather list (SGL) using the registration information in order to receive data directly into the user application's buffers and, if immediate data is indicated, to receive status and immediate data directly into either the application's descriptor. If immediate data is not indicated, no status is transferred;
Build and start 914 an XL2 SCSI FCP XFER_RDY I/O;

XL2s:
SCSI FCP data transfer of sending data buffer 912. This includes immediate data (if indicated) from sending descriptor, and status from LSB into the receiving data buffer and receiving descriptor;

Receiving Vito Protocol (SCSI FCP XFER_RDY complete):
Build and start 915 an XL2 SCSI FCP RESP I/O, indicating success;
Free the SGL 916, and any local data structures other than the IORB) associated with this 1%;
Call Msg Unit 917, passing the IORB, for completion notification processing if there was immediate data;

Sending Vito Protocol (Vito Send response received):
Free the SGL 918, and any local data structures other than the IORB) associated with this I/O;
Call Msg Unit 919, passing the IORB, for completion notification processing;

RDMA-Read processing is different from Send and RDMA-Write processing in that the initiator of the operation receives the data. The processing sequence is illustrated in FIG. 10. Again we have data items, steps and queries identified below that appear in the Figure in order to detail the message flows for RDMA Read processing.

Initiator Vito Protocol (IORB passed by Msg Unit):
Queue the IORB 1002 on the appropriate VI's RDMA-read queue;
Query 1003, Is this the first IORB on the RDMA-read queue?
Build 1004 an XL2 scatter/gather list (SGL) 802e using the registration information in order to receive data directly into the user application's buffers (no status or immediate data is transferred for RDMA-R operations);
Build and start 1005 an XL2 SCSI FCP CMN I/O containing a Vito RDMA-Read command and the source memory region;

Responding Vito Protocol (SCSI FCP VIA RDMA-Read command received):
Query 1006, Are any of these criteria invalid:
The VI is still open,
The VI has RDMA-R enabled,
VI and memory region protection tags match,
Memory region has RDMA-R enabled,
The source memory region is valid,
Build and return 1007 a SCSI Error Response with the appropriate VIA RDMA-Read result code;
Return 1008;
Fetch the memory registration information 1010 for the source memory region indicated in the command;
Build 1011 an XL2 scatter/gather list 802f using the remote memory virtual address and remote memory handle received in the FCP_CMD in order to send the data directly from application's buffer (not status or immediate data is transferred for RDMA-R operations);
Build and start 1012 an XL2 SCSI FCP RESP I/O, including the requested data;

XL2s:
SCSI FCP data transfer 1013 from source application buffer and LSB into sending application buffer and descriptor;

Initiating Vito Protocol (SCSI FCP VIA RDMA-Read response received):
Free the SGL 1014, and any local data structures other than the IORB) associated with this I/O;
Call Msg Unit 1015, passing the IORB, for completion notification processing;

Responding Vito Protocol (SCSI FCP VIA RDMA-Read response complete):
Free the SGL 1016, and any local data structures other than the IORB) associated with this I/O;

Completion notification is important to the protocol. There are two kinds. Send work queue items complete in a different way from that in which the receive work queue items complete. Also, the notifications to the host software that descriptors have completed are generated differently depending on whether the work queues are associated with CQs.

Just as the XL2 SGL allows received data to be transferred directly into the application's buffers by the XL2, the status and any immediate data information is transferred directly into the application's descriptor. No software intervention is required on either the NIC or the host to complete receive descriptors.

Unlike receive descriptors, Send, RDMA-Write, and RDMA-Read descriptor processing does not involve receiving any data into application buffers. SCSI FCP RESP frames, as described in the data blocks of FIG. 15 (, the data segments on the right), are received by the initiating Vito Protocol with the final status, but those frames can not be scattered by the XL2. Therefore, the descriptor status must be updated through software intervention. (FIG. 15 data segments on the left describe the prior art design for SCSI RESP frames, leaving available space for innovation).

The normal design would be for the Vito Protocol to update the descriptors directly, no matter where they are located in host memory. Due to deficiencies in the IntelliFibre hardware platform, however, direct update by the Vito Protocol is very inefficient if they are located above the level of 4 GB. A different method, where each VI has a Send Completion Counter in low host memory is used instead, since our preferred embodiment uses IntelliFibre (a trademarked name for a Unisys product suite), but one could use direct update in other environments or even this one if desired. When the Vito Protocol completes a descriptor on the send Work Queue successfully and that WQ is not associated with a CQ, it increments a local copy of the VI's Send Completion Counter, then writes that new value to the host-resident Send Completion Counter for that VI. If, on the other hand, the WQ is associated with a CQ, the Kernel Agent updates the host-resident Send Completion Counter when the corresponding entry is removed from the Master Completion Queue (MCQ).

This method is more efficient for two reasons: a) in cases of heavy load, the host-resident Send Completion Counter need only be updated periodically, rather than for every single descriptor; and, b) when the Work Queue is associated with a Completion Queue, the successful completion indication is conveyed through the CQ, which must contain an entry for every completed descriptor anyway.

If the descriptor is completing with an error, our preferred Vito Protocol uses the less efficient path of updating the descriptor directly, since a) there is additional error information that must be conveyed to the application through the descriptor, and b) the performance of error cases is not critical.

For Work Queues which are not associated with a CQ, notifications that descriptors have completed use a data structure called the WQ Notification Request Area (WQNRA) for notification of completion, located in NIC memory. The WQNRA is an array of counters indexed by the WQ id (a tuple consisting of the VI number and a flag indicating either the Send or Receive WQ). The VIPL writes to the WQNRA entries, and the Msg Unit reads the entries. The WQNRA is only updated by the VIPL when an application must wait for a descriptor to complete. Therefore, the Msg Unit need only interrupt the host when an application is actually waiting, so any completions that occur when no application is waiting do not generate host interrupts (and therefore save on associated overhead). WQNRA processing uses steps, queries and data items which are illustrated in FIG. 11 describing the WQ Completion Notification Message Flows, and these are described as follows:

Data Items:
  WQNRA (Work Queue Notification Request Area) 420a, is an array of words in NIC memory indexed by WQ Id, which is incremented by the VIPL when an application thread waits on the associated WQ. The Msg Unit remembers the NRA values from the last notification for specific VIs in the corresponding local VI_Table entries. When a descriptor completes and the saved NRA value is different from the current NRA entry, a notification is issued. 1101VI_Table[VI#].xNRA (.SNRA or .RNRA)—the NIC-resident copy of VI#'s Send/Receive WQ NRA entry value from the last time a notification was issued.
  VI.xNRA (.SNRA or .RNRA) 1102 is the host-resident copy of the last Send/Receive WQ NRA value written by the VIPL for a particular VI.
  Send_Completion_Count[VI#] 1103 is the host-resident counter indicating how many Send/RDMA-W/RDMA-R descriptors have completed for a particular VI#.
  VI.Send_Returned_Counter 1104 is the VI-specific counter, local to the VIPL, which indicates how many Send/RDMA-W/RDMA-R descriptors have been returned to the application.
  VI_Table[VI#].Send_Completion_Counter 1105 is the NIC-resident copy of VI.Send_Returned_Counter [VI#].

Application (Wait on WQId):
  Wait for a descriptor to complete 1106 via VipRecvWait( ) or VipSendWait( );

VIPL (VipRecvWait( ) or VipSendWait( ) called):
  Query 1107, Is this a Receive WQ?
    Query 1108, Is the descriptor at the head complete?
      If yes, Delink descriptor and return 1109 the descriptor to the application;
    If No, this is a Send WQ so:
      Query 1110, Is the Send_Completion_Counter[VI#]> the
      VI.Send_Returned_Counter?
        Assuming yes, Update 1111 the status of the descriptor at the head of the Send WQ indicating success;
        Increment 1112 VI.Send_Returned_Counter;
        Delink 1113 the descriptor and return it to the application;
      Increment 1114a VI.xNRA;
      Write 1115 the VI.xNRA value to the WQNRA[WQId] entry;
      Check the head of the WQ again and process it if one is there 1116;
      Wait 1117 on an event shared between the VIPL and Kernel Agent;

Msg Unit (WQ IORB completes):
  Query 1118, Is the WQ a Send WQ?
    Increment a local VI_Table[VI#].Send_Completion_Counter variable 1119;
    Write 1120 the incremented value to Send_Completion_Counter[VI#] in host memory;
      /REM/ This could be batched with later ones/END REM/ Query, 1121, Is WQNRA[WQId] different than VI_Table[VI#].xNRA (a saved copy of what it was the last time the Msg Unit checked it)?
    Assuming yes, Write 1122 a WQ completion message to the In Post FIFO, indicating WQID;
    Save 1123 the current WQNRA[VI#,Recv] value in VI_Table[VI#].RNRA;

Kernel Agent (In Post FIFO WQ completion message received):
  Set 1124 the indicated WQ's event;

VIPL (wakeup from WQ event):
  Step 1125, GOTO 1107;

For Work Queues which are associated with a CQ, notifications that descriptors have completed use a data structure called the CQ Notification Request Area (CQNRA), allocated by the Kernel Agent and located in host memory. The CQNRA is an array of counters indexed by the CQ id (assigned by the Kernel Agent at VipCreateCQ( )). The VIPL writes to the CQNRA entries, and the Kernel Agent reads the entries. The CQNRA is only updated by the VIPL when an application must wait for a descriptor to complete (via VipCQWait( )). Therefore, the Kernel Agent need only set the event that the thread which called VipCQWait( ) is waiting on when an application is actually waiting, so any completions that occur when no application is waiting do not cause events to be set (and therefore save on associated overhead). CQNRA processing is illustrated in FIG. 12 with data items, steps and queries described as follows:

Data Items:
  CQ[CQId] 1201 is the kernel-resident array of CQ-specific structures, each containing the following fields:
    NRA 1202, a counter that the VIPL increments when it wants the Kernel Agent to wake it up following the next completion.
    KA_NRA 1242, a Kernel Agent-local counter indicating the value of the .NRA field for this CQ the last time the Event for this CQ was set.
    Event 1203, an event, waited on by the VIP, which is set by the Kernel Agent when the CQ's .NRA is different from its .KA_NRA.
    Entries[MAX_CQ_ENTRIES] 1204, an array of completions specific to CQId.
  MU_MCQ 1205 is the NIC-resident queue where the Msg Unit temporarily saves completions until they are copied to the host-resident MCQ.
  MCQ 1206 is the host-resident Master Completion Queue that holds all completions for all CQs created on a particular NIC.
  MCQ_NRA 1207 is the NIC-resident counter which is used by the Kernel Agent to request a notification from the NIC the next time the MCQ is updated.
  KA_MCQ_NRA 1208 is the Kernel Agent-local NIC-specific counter, which the Kernel Agent increments and then writes the value of to the MCQ_NRA.
  MU_MCQ_NRA 1209 is the Msg Unit-local counter indicating the value of MCQ_NRA the last time the MCQ was updated.

Notification_Timer 1210 is a timer, managed by the Kernel Agent, which facilitates polling of the MCQ by the Kernel Agent.

Application (Wait on WQId):
   Wait 1211 for a descriptor to complete via VipCQWait( );

VIPL (VipCQWait( ) called):
   Query 1212, Is the CQ nonempty?
     1213Remove the completion notification from the head of the CQ (note that descriptors are not delinked from their respective WQs until the application call VipRecvDone( ) or VipSendDone( ));
     Query 1214, Is the notification for a Send WQ?
        Query 1215, Is the Send_Completion_Counter [VI#]>the VI.Send_Returned_Counter?
          Update 1216 the status of the descriptor at the head of the Send WQ indicating success;
          Increment 1217 VI.Send_Returned_Counter;
     Return 1218 the WQ indication to the user application;
   Atomically increment 1219 CQ [CQId].NRA;
   Check 1220 the head of the CQ again and process it if one is there;
   Wait 1221 on CQ[CQId].Event;

Msg Unit (CQ IORB completes):
   Insert 1222 a notification message, indicating the WQId of the completed descriptor was posted to into a local MU_MCQ queue;
   When sufficient completions have been added to the MU_MCQ, or a sufficient period of time has elapsed since the last MCQ update, or the MCQ_NRA is not equal to MU_MCQ_NRA, all entries in MU_MCQ are copied 1223 to the host-resident MCQ in bulk;
   Query 1224, Is the MCQ_NRA not equal to MU_MCQ_NRA?
     Write 1225 a CQ notification message to the In Post FIFO;
     Copy 1226 the value of MCQ_NRA to MU_MCQ_NRA;

Kernel Agent (CQ notification message received or Notification_Timer expiry):
   Do step 1227 For each unprocessed MCQ entry:
     Copy 1228 the MCQ entry to the appropriate CQ[CQId].Entries[ ];
     Query 1229, Is CQ[CQId].NRA different from CQ[CQId].KA_NRA?
        1230Remember to set CQ[CQId].Event;
   Do step 1231 For each remembered CQ:
     Set 1232 CQ[remembered CQId].Event;
     Copy 1233 CQ[remembered CQId].NRA to CQ[remembered CQId].KA_NRA;
     Query 1234, Is the option to request notifications for this NIC set?
        Increment 1235 KA_MCQ_NRA,
        Write 1236 the value in KA_MCQ_NRA to MCQ_NRA;
     No, the NIC should not send notifications:
        Start 1237 the Notification_Timer;

VIPL (awaken from wait on CQ event):
   Remove 1238 the notification from the head of the CQ.Entries[ ];
   Query 1239, Is the completion for a Send WQ?
     1240Update the status of the first descriptor on the Send WQ;
   Return 1241 the WQ indication to the application;

Memory deregistration is a process by which memory owned by a process is let go and returned to the system for others to use. In our preferred embodiments this is done "lazily", that is, the RCM (i.e., the Registration and Control Module which is a NIC component function and handles other tasks besides memory registration and deregistration as mentioned above) does not deregister memory regions until either during idle time, or when a previously registered region is validated prior to its use. This saves processing overhead when regions are registered and deregistered without ever having been used in a processed descriptor, which would otherwise be the case in a normally operating computer system. Also, since memory handles are allocated in a round-robin fashion, they will not be reused after being deregistered for a considerable period of time. It is quite likely that the NIC will experience idle time, during which the deregistrations will be processed (lazily), before the deregistered memory handles are reused. This allows the NIC to process deregistrations during otherwise idle time, rather than during periods of heavy load. The message flow for memory deregistration is outlined in FIG. 13 and the data items, steps and queries used are described as follows:

Data Items:
MDL (Memory Deregistration List) 1301 is a list in NIC memory containing memory handles to be deregistered.

MDL_Insert 1302 is a Kernel Agent-local counter indicating where in the eMDL the next deregistered memory handle should be inserted.

MRT (Memory Region Table) 1303 is a host-resident table maintained by the Kernel Agent, containing all registration information for all memory regions registered on a particular NIC.

MRT2 (Memory Region Table shadow) 1304 is a the NIC-local copy of the active MRT entries.

Application:
   Call VipDeregisterMem( ) 1305;

VIPL (VipDeregisterMemo( )):
   Call Kernel Agent, passing memory handle 1306;

Kernel Agent:
   Atomically increment 1307 MDL_Insert for the selected NIC;
   Write 1308 the memory handle to the MDL at MDL_Insert;

---

RCM (Called to validate a memory region, or during idle time):
   Do the following 1309, For each entry in the MDL:
     Invalidate 1310 the memory region in the MRT2;
     Query1311, Was this a call to validate a region?
        Fetch 1312 any new region information from the MRT in host memory;
        Query1313, Was the region reregistered?
          Return OK 1314;
        No, the region was not reregistered after being deregistered:
          Return NOT_OK 1315;

---

Section 7 of the SCSI FCP 1.0 specification details the formats of the SCSI FCP information units (IUs). The Information Unit (IU) is a term used to describe the payload within the Fibre Channel Frame. The Fibre Channel Frame contains a header that includes Information Category (IC) bits which describe the type of IU in the payload. The IUs we use are FCP_CMD (IC=6), FCP_DATA(IC=1), FCP_XFER_RDY (IC=5) and FCP_RESP(IC=7).

The Vito Protocol extends the IU format in such a way that VIA semantics can be represented, while still being interpreted and accelerated by off-the-shelf Fibre Channel controllers thus producing VI over SCSI-FCP Protocol. Off-the-shelf Fibre Channel controllers, such as the Agilent Tachyon XL2, accelerate the processing of SCSI FCP traffic by implementing certain protocol functions, such as FCP_CMD/FCP_XFER_RDY/FCP_DATA/FCP_RESP IU sequencing by using exchange identifier tracking; interrupt consolidation; segmentation and reassembly of large data IUs; and other functions understood by users of the XL2. Because of this acceleration processing by the controller, the software drivers do not have to build, initiate, or handle the interrupts for intermediate protocol frames.

The ordering of the Vito fields in the IUs maps to the indicated SCSI FCP_CMD fields. The preferred embodiment's FC controllers and software drivers interpret the SCSI FCP_CNTL (Exec Mgmt Codes) and FCP_DL (Data Length) words of the FCP_CMD and treat the frame as any other SCSI frame.

The modifications to the FCP IUs used for this VI over SCSI-FCP Protocol are as follows:

FCP_CMD IU
  VI Number—the local VI identifier
  Remote VI Number—the remote VI identifier
  VI Control Segment Flags—VI control segment flags (i.e. immediate data)
  VI Operation Type—identifies the VI operation
    VIFC_OP_SEND—a send operation
    VIFC_OP_RDMAR—an RDMA Read operation
    VIFC_OP_RDMAW—an RDMA Write operation
    VIFC_OP_CONN_LOST—a VI connection lost indication
  FCP R/W bits—SCSI Exec Mgmt Codes—Read Data/Write Data
    RDMA Remote Memory Handle—for RDMA operations the remote memory handle associated with the memory to/from which data is to be written/read.
  Upper RDMA Remote Memory Virtual Address—for RDMA operations the upper 32 bits of the RDMA memory virtual address.
  Lower RDMA Remote Memory Virtual Address—for RDMA operations the lower 32 bits of the RDMA memory virtual address
  Data Length—the length of the data to be sent, written or read.

Note that the changes to the FCP_CMD IU described here are illustrated on the block diagram of FIG. 14 on the right, compared to the standard which is illustrated on the left.

FCP_RESP IU
  VI Status Code—VI status code maps directly to the VI codes defined in the VIA specification and stored in the Status field of the descriptor Control Segment (i.e. VIP_SUCCESS=0) when the descriptor completes.

Note that the changes to the FCP_RESP IU described here are illustrated on the block diagram of FIG. 15 on the right, compared to the standard which is illustrated on the left.

Physically Independent Consolidated NICs (PICNIC).

One of the main drawbacks of VIA is how primitive the NIC management is under current VIA implementations. For example, if a computer has multiple NICs connected to the same network (i.e. with connectivity to the same set of remote nodes), the user application must create and manage VIs on each of the NICs if it wants to take advantage of the added capacity. Also, if one of those NICs fails, whatever VIs have been created or exist on that NIC close catastrophically.

PICNIC (Physically Independent Consolidated NICs) is a technique to overcome both of these problems. With our PICNIC architecture, the application uses the standard VIPL functions to create VIs, CQs, and other VIA objects. Those objects are associated by the Kernel Agent with logical NICs, rather than with the actual physical NICs. These logical MCs can be associated with multiple physical NICs, but the application "sees" only one logical NIC. In that way, additional capacity can be added, and the multiple VIs of the same or multiple applications can be load balanced across the physical NICs associated with the one logical NIC, transparently to the application and in real time, to accommodate other unrelated processes.

In addition, if one of the physical NICs of a PICNIC group fails, the VIs, CQs, etc. associated with that NIC will be migrated to the remaining NICs transparently to the user applications, since the Kernel Agent tracks the mapping of logical-to-physical NICs. This resiliency provides a very high level of reliability.

FIG. 17 illustrates how the PICNIC-enhanced VIA provider facilitates simplification in programming and resource management along with the aforementioned resiliency and transparency. The Figure provides an example R which is a non-PICNIC enabled VIA provider providing a comparison to our inventive one supporting PICNIC S. Both are shown from an application's perspective. While maintaining standard API semantics, providing a PICNIC system reduces the application's view of multiple NICs and multiple networks to a single instance of each. This makes interfacing to the application and associated programming tasks more simple and straightforward since only one NIC and network needs to be known to the application. Because PICNIC maintains standard API semantics, applications currently restricted to using only one NIC can transparently benefit from increased connectivity and throughput, since the application can now communicate through multiple networks and NICS when it still "thinks" it is communicating through only one.

To present the simplest model to applications, a PICNIC enabled VI Provider presents only a single user-visible NIC object that encompasses all physical NICs on the system. (VI Provider is a term used to describe an entire VIA software and hardware package (VIPL, Kernel Agent and NIC) provided by a specific vendor. Vito is the engineering name of the preferred embodiment VI Provider.) While the PICNIC description here shows that model, the architecture allows presentation of multiple user-visible NIC objects, each containing a unique group of physical devices. Such configurations may be desirable, for instance:
  To accommodate mechanisms employed by existing applications, or
  To force separation of distinct workloads onto separate VI NIC and/or networks, or
  Group NICs that provide similar functional capability (see the discussion of NIC Attribute Handling).

PICNIC Data Structures.

FIG. 18 illustrates the PICNIC data structures for comparison to the data structures of the preferred Vito implementation of FIG. 4.

In addition to the data structures defined with respect to FIG. 4 in discussion above, other data structures for PICNIC architecture are described below (see FIG. 18).

PNIC (Physical NIC) 1801. This is a data structure for keeping data needed and used to manage each instance on a Vito NIC.

LNIC (Logical NIC) 1802. This data is used by the Kernel Agent to manage the NIC object(s) made visible to the VIPL/Application. The LNIC includes linkage to all PNICs for devices within the logical NIC.

PTAGT 1803. This data structure is in a table form, preferably, called a Table of Protection Tags, and it is allocated on request by VI applications. Each Protection Tag must be unique within a NIC (i.e., only one application has privileges based any one Protection Tag).

As shown in FIG. 18, an instance of the data structures MCQ 408 and TT 409 exist for each physical device. Data structures SCC 410, CQ NRA 411, MRT 417, and PTAG exist only at the LNIC level, allowing them to be shared and applied to all devices within an LNIC.

PICNIC Functions.

Relative to our preferred VI implementation, the following subsections describe additional and/or altered processing required to implement the PICNIC architecture. These functions include NIC Attribute Handling, Network Address Visibility, Load balancing, VI Creation, Memory Registration and Memory Deregistration, Changing Memory Attributes, Dialog Establishment, Descriptor Posting, Descriptor Processing, Work Queue Notification, and Completion Queue Notification, and are discussed in that order, below.

NIC Attribute Handling

VI architecture defines a set of application-visible NIC attributes, with each NIC having potentially unique attribute values. Because PICNIC "hides" details of individual NICs, it must somehow present a rational set of values to the application. This list provides preferred suggested handling for each attribute that requires handling. One can make other use of these attributes if desired.

Name, Hardware Version and ProviderVersion: Generate alias values for the logical NIC.

NicAddressLen, ThreadSafe, MaxDiscriminatorLen, MaxDescriptorsPerQueue and MaxSegmentsPerDesc: These attributes should be consistent across all PNICs within the LNIC, thus, pick and use a consistent value. Since some of these attributes are dependent on the amount of memory on the NICs, values should be chosen which can be supported by the least-capable NIC.

LocalNicAddress: see Network Address Visibility discussion below.

MaxCQEntries and MaxCQ: In PICNIC, these values are independent of PNIC's capabilities; return the value supported by VIPL and Kernel Agent.

MaxRegisterBytes and MaxRegisterRegions: Return the minimum limit across all PNICs within the LNIC, the Kernel Agent and the VIPL. Note that in the preferred implementation, MRT2 caching allows the PNIC to be effectively limitless; only the Kernel Agent limits these values.

MaxRegisterBlockBytes, MaxTransferSize and NativeMTU: Return the minimum limit across all PNICs within the LNIC, the Kernel Agent and the VIPL.

MaxVI:—Return the summation across all PNICs within the LNIC, unless the Kernel Agent or VIPL requires a more restrictive value.

MaxPTags:—Return the summation across all PNICs within the LNIC, unless the Kernel Agent or VIPL requires a more restrictive value. In the preferred implementation, the NIC has no restriction on the number of protection tags supported.

ReliabilityLevelSupport and RDMAReadSupport: These attributes should be consistent across all NICs, use the consistent value. Alternatively, the least restrictive value can be reported and while assigning a VI to a specific physical NIC, the requirements of the VI can be used to restrict selection to a NIC providing the capabilities required for the VI.

Network Address Visibility

In VI architecture, the application has visibility to the physical address of each NIC on its local system via the VIQueryNIC function. Visibility of remote physical addresses is typically controlled configurationally through Name Services; Name Services configuration may make all remote addresses visible, or may restrict visibility to a subset of remote systems and, for each remote system, a subset its of available addresses.

Because PICNIC "hides" details of individual NICs, the address returned in the VipQueryNic function takes on different meaning. The preferred implementation returns an alias value, reflective of the entire system; if multiple logical NICs are presented, each alias is uniquely qualified. This alias value(s) may be user-configured; if not a system-dependent default is provided to make this PICNIC system work.

PICNIC allows remote address visibility to continue to be controlled via Name Services configuration. Name Services configuration allows an alias physical address to be specified rather than a specific physical address. When the alias address is specified, the VI Provider is free to select any appropriate NIC for the VI connection.

Load Balancing

Many variations on an algorithm to assign a VI dialog to a specific NIC are possible and there are multiple preferred forms. Thus we provide suggestions for such an algorithm to avoid undue experimentation on the part of the reader in constructing one appropriate to his system.

The initial assignment of a VI to a particular NIC may be performed at VI creation or at dialog establishment time. Pros and cons of each approach are discussed here and elsewhere.

Load balancing may be accomplished via simple round-robin VI assignment among appropriate NICs (those having network connectivity to the remote destination), attempting to keep the total number of VIs on each PNIC roughly equal over time. A more complex algorithm, accounting for actual NIC utilization would be preferred but is not a requirement. That is, selection should be biased towards NICs having lighter loads (in terms of actual data transfer) if possible.

A more fully featured algorithm may additionally recognize that a particular NIC has become overloaded and move some of its workload to another NIC, thus providing relief during periods of high activity.

VI Creation

For a PICNIC implementation to avoid considerable constrictions, VIs should not be tied to a particular PNIC at creation time (i.e., VipCreateVi), but rather should be assigned to a PNIC during dialog establishment. Creation time assignment to a physical NIC is not advised for two reasons. First, the NIC selected must have network connectivity to the eventual remote system/NIC. No information is available at creation to determine the remote endpoint. This can only be avoided by requiring that all PNICs have equal connectivity which limits configuration options and detracts from the resiliency capability of PICNIC. Second, in a load balancing scheme that takes actual NIC utilization into account, the utilization information available at VI creation time may have no relationship to utilization when the VI becomes active.

If VI NIC assignment is not performed at creation time, any device-specific information that previously would have been provided to the VIPL at VI creation time can no longer be provided and is delayed until the dialog establishment occurs (or whenever VI NIC assignment occurs). In the preferred implementation, this includes the location of the TT and WQ NRA.

From the NIC's perspective, this does not create any issues; the Kernel Agent simply configures the VI within the NIC at assignment time, when the application needs to use it. Any information required by the NIC is available at that point.

Memory Registration

Because the Kernel Agent maintains a common MRT that is accessible (read-only) by all NICs associated with the corresponding LNIC, no additional or altered processing is required. (MIT's will be recalled to be Memory Region Tables, which are maintained by the Kernel Agent, and which allow the Vito Protocol to program the XL2 to enable the XL2 controllers to directly access user buffers.)

Two of the limitations on a VI Provider are the total amount of memory regions that can be registered and the total amount of memory that can be registered. Each of these can pose restrictions which limit performance of VI applications. In a multiple NIC configuration, memory may need to be registered multiple times (possibly, one registration for each NIC). PICNIC architecture presents a significant advantage in these cases as a single registration makes memory available to all devices within a logical NIC.

Memory Deregistration

Because any of the devices within an LNIC may have references to the region being deregistered, the Kernel Agent processing steps described above (in discussions of FIG. 13) are repeated for each device associated with the corresponding LNIC.

Changing Memory Attributes

Memory attribute changes operate in both the PICNIC and in the ordinary NIC systems. They operate as follows.

The VipSetMemAttributes API allows the application to change attributes (Protection Tag, Enable RDMA Write, Enable RDMA Read) of a previously registered region. This operation is handled by the following three processing steps:
1. Update the MRT with the new attribute value(s).
2. Perform the actions described for Memory Deregistration. This invalidates the MRT2 entry in each device within the LNIC.
3. Because the MRT2 entry is invalidated, when any NIC next validates the memory handle, it will retrieve the information stored in the modified MRT as described for memory registration.

Dialog Establishment

Dialog establishment functions (e.g., VipConnectWait, VipConnectRequest), must deal with the Network Address Visibility and Load Balancing aspects unique to the PICNIC architecture.

In the preferred implementation, for VipConnectRequest and VipConnectPeerRequest, the load balancing algorithm is invoked to assign the VI to a specific PNIC before issuing a dialog establishment request to the specified remote system. This is required, as the establishment request must supply the remote system with the requesting VI's actual physical address. The VI Provider is free to select any local PNIC having network connectivity to the remote address requested in the connect request.

For VipConnectWait and VipConnectPeerWait, a load balancing algorithm is preferably invoked to assign the VI to a specific PNIC upon receipt of a matching dialog establishment request. If the requestor specified an alias address, the VI Provider is free to select any local PNIC having network connectivity to the requesting VI's physical address; otherwise, the specific device must be selected.

Descriptor Posting

By maintaining a unique TT 409 and unique Out FIFO 413*q* for each physical NIC, processing required to post descriptors is minimally effected by PICNIC.

If a PICNIC implementation does not assign VIs to a specify PNIC until dialog establishment time, special handling for post operations performed before a VI is actually assigned to a physical NIC is required. Note that descriptors may be legally posted to the Receive WQ by the VIPL on behalf of an application prior to completion of dialog establishment with the peer Kernel Agent, but descriptors posted to the Send WQ prior to establishment completion should be treated as an error condition. Thus, the VI connection/dialog is established between two VIs (they may be on different NICs or the same NIC if loopback is being used). Send and receive descriptors are posted to the VIs via the VIPL which forwards the descriptors to the NIC. The VIA specification states that receive descriptors may be posted prior to the connection/dialog opening, while send descriptors cannot be posted until the connection/dialog is fully open. The issue for PICNIC is that it has to hold on to receive descriptors that are posted prior to the connection opening until it has determined what physical NIC the VI is associated with once the connection is fully open.

A solution to this issue is as follows:
  In the VIPL, if a post operation is performed before the VI is assigned to a PINIC, the posted descriptor is inserted into the corresponding WQ and no other processing occurs at this time.
  In coordination between the VIPL and Kernel Agent, when a VI is assigned to a physical NIC (i.e., after determining the VI's TT location), VIPL scans all entries currently in the VI's WQs, performing the post-time processing that was originally delayed.

Descriptor Processing

Except as needed for completion processing and notification, PICNIC has no effect on descriptor processing in the NIC.

Work Queue Notification

Except for issues related to when the information needed to perform these operations becomes available, work queue notification as previously defined is sufficient for a PICNIC implementation. This is due to the fact that the WQ NRA 420 and SCS are per-VI data structures.

The VI provider may have to handle VipRecvWait operations before a VI is assigned to a physical NIC (VipSendWait should be treated as any error condition in this case). VIPL is not able to set the corresponding WQ NRA entry during the VipRecvWait since it resides in the yet-to-be-determined physical NIC. To solve this, VIPL simply goes into its wait statement. When the VI is assigned to a PNIC, the WQ NRA 420 can then be set. VIPL could always set the WQ NRA value, or, alternatively, to avoid this minor overhead when a wait is not outstanding, VIPL can remember if a wait is outstanding and only set the WQ NRA when required.

Completion Queue Notification

The VI Architecture model describes a Completion Queue as being shared between the VIPL and VI NIC. The VI NIC maintains a circular insert pointer into the shared CQ and inserts Completion Queue entries directly. This model is not sufficient for PICNIC because in the PICNIC model, WQs for VIs residing on different physical NICs may be associated with the same CQ. Without a cross-NIC atomic increment mechanism, which is not supported by PCI, the integrity of the Completion Queue and its insert pointer can not be guaranteed. Thus, by guaranteeing the atomicity of the CQ increment mechanism, although there are two ports (one for each XL2 on the FCIOP) they can safely appear as one single NIC to the remote endpoint. There may be two NICs having four XL2s, but the point is it still looks like only two NICs (not four NICs) to the application, even thought the throughput is that of four NICs.

While the MCQ mechanism provides optimization for the non-PICNIC architecture, it (or some other solution) is required for PICNIC. The MCQ model is sufficient for PICNIC since each physical device has a unique MCQ (Master Completion Queue), avoiding write access to the same structure from multiple NICs.

Port Aggregation.

The current embodiment of Vito uses the Unisys-built IntelliFibre HBA as a physical NIC. Alternative embodiments could be designed based on the teachings of this patent which use other Physical NICs that adhere to the general architecture and provide a similar protocol to Vito as we have described herein. Thus this Port Aggregation concept could be applied to any SCSI connection.

Each of the Unisys IntelliFibre HBA NICs has two independent 2 Gbps Fibre Channel ports, each with a separate XL2 controller. Vito aggregates those ports such that they appear to both local applications and remote applications as a single NIC. This aggregation means that if the ports have the same connectivity by both being connected point-to-point to the same remote NIC, to the same arbitrated loop, or to the same fabric, Vito load-balances VIs across both ports. This gives the effective bandpass of a 4 Gbps link. If the ports do not have the same connectivity, they function independently, although they still represent the same NIC to remote systems.

According to the Fibre Channel and SCSI FCP standard, nodes may only communicate when they have established a logical communication path between pairs of nodes. This path is known as a login. The term "login" is also used as a verb to indicate the act of establishing such a communication path.

In the SCSI FCP, logins are not symmetric. That means the initiator of the login is the only node allowed to issue commands. The non-intiating node (the responder or target) may only respond to commands issued by the initiator. To allow bi-directional, symmetric communication, pairs of logins must be established. If, for example, Node A and Node B wish to communicate using Vito, Node A initiates a login to Node B (Login I) and Node B initiates one to Node A (Login II). After these logins are established, when Node A sends messages to Node B it uses Login I, and when Node B sends messages to Node A, it uses Login II.

The Fibre Channel standard specifies multiple layers of logins. Vito uses two layers of logins, known in the Fibre Channel standard as FC-2 and FC-4. A Vito communication path consists of a total of three logins, 1 FC-2 and 2 FC-4 logins. The FC-2 login is established when known standard Fibre Channel methods are used to discover other Vito nodes. In the preferred embodiment, common elements of the nodes' Fibre Channel world-wide names (WWNs) are used to identify a port or node as Vito-capable. A WWN is an assigned identifier which uniquely identifies a particular node or port. Known standard Fibre Channel mechanisms exist such that when a port (in our case that includes a Vito port) becomes active on a link, that port and all other Vito ports to which the newly active port can communicate, either point-to-point, on an arbitrated loop, or through a switched fabric, discover each other. After this discovery mechanism completes, an algorithm is used to establish the three logins which constitute a path as follows:

Note that in all of the following descriptive commentary, 'z' is used to indicate that the port is one illustrated in FIG. 19 After each mention of a port the process for activating it is described:

Port z03*a* (NPort ID=2) becomes active:

Discover other Vito nodes;

For each discovered Vito node:
 Is the discovered port's NPort ID (1)<this port's (2)?
 Initate FC-2 login (originator);
 No, the discovered port's NPort ID>2:
 Await a FC-2 login;

Port z03*b* (NPort ID=1)—port z03*a* becomes active:

Is newly active port's NPort ID (2)<this port's (1)?
 Initiate login as originator;

No, the newly active NPort ID (2)>1:
 Await a FC-2 login;

Port z03*b*—FC-2 login request received:

Validate WWN is a Vito WWN;

Accept FC-2 login (responder);

Port z03*a*—FC-2 login accepted:

Initiate a FC-4 login (originator);

Port z03*b*—FC-4 login request received:

Validate WWN matches FC-2 WWN;

Accept FC-4 login (responder);

Initiate a FC-4 login (originator);

Port z03*a*—FC-4 login accepted:

Validate WWN matches FC-4 WWN;

Await FC-4 login request;

Port z03*a*—FC-4 login request received:

Validate WWN matches FC-2 and FC-4 WWN;

Accept FC-4 login (responder);

Mark this path open;

Port z03*b*—FC-4 login response received:

Validate WWN matches FC-2 and FC-4 WWN;

Mark this path open.

Port aggregation using these types of ports is accomplished by using these two levels of Fibre Channel logins. When an application wishes to target a remote NIC it provides as the remote host address the NIC's node WWN (not either of the port WWNs). Either or both ports of the initator and responder nodes may be used for subsequent communication. Hence, depending on the physical configuration, from one to four communication paths may be used.

Although it will be apparent to one of skill in this art, it is useful to state the advantages of this method. Note that the effective bandwidth for a single NIC is now 4 Gbps bandwidth since the load can be balanced across two ports. There is also some added resiliency, that is, if one link fails, VIs fail over to a surviving link transparently. Additionally, the message rate can be effectively doubled, assuming that the XL2 controllers are the bottleneck.

FIG. 19 shows a host z01a, which is connected to each of four other hosts through one of three Fibre Channel link types which can be used when using this invention: 1) point-to-point, 2) arbitrated loop, and 3) fabric. Point-to-point links directly connect pairs of ports. Arbitrated loops allow multiple ports to share a single link. Fabric links connect an end-node to a switch, and thereby to all other end-nodes connected to all other switches on the fabric.

Also in FIG. 19, host z01a and host z01b are connected by a point-to-point link z04a and another point-to-point link z04b. These two physical connections are aggregated into one Vito path.

Host z01a is connected to host z01c and z01d in FIG. 19 by arbitrated loop z05a and by a parallel loop z05b. It does not make sense to aggregate ports onto a single arbitrated loop, since the aggregation onto a single arbitrated loop would be restricted to the throughput of a single link anyway, meaning that no resiliency could be possible. Rather, it is better to use two parallel loops with the same connectivity, thereby aggregating the bandwidth of both loops, and also providing redundant paths between nodes. This redundancy allows for resilient VIs, in that if one loop fails, the VIs assigned to the ports attached to that loop can fail-over to the port on the surviving loop.

Since each port is physically connected to every other port on the loop, there are Vito paths (triples of on FC-2 and two FC-4 logins) between each pair of ports.

In FIG. 19, host z01a is also connected to a host z01e by a switched fabric. A port z03c of NIC z02b is connected to a switch z07a by a fabric link z06a and another port z03d of NIC z02b is connected to a different switch z07b by a fabric link z06b. The two switches are in turn connected through the fabric. Likewise, a second host z01e contains a port z03m and another port z03n on NIC z02g, which are connected to the two switches. The fabric links can be aggregated and they are redundant, and thereby support VI resiliency. Assuming redundant paths through the fabric between switch z07a and switch z07b, there is no single point of failure external to host z01a and host z01e.

The table in FIG. 20 shows all the Vito paths that exist in FIG. 19, and the links and switches they traverse. "Lb" indicates a loopback path. Loopback paths exist whenever the port is active.

Thus we have described several innovative features which can be implemented in hardware and software, and to which additional innovations may be made. The scope of the invention is only limited by the following appended claims.

What is claimed is:

1. A data management component for tracking a plurality of Network Interface Card (NIC) connections resident on a computing system, wherein said computing system employs Virtual Interface Architecture (VIA) for data communications from a VIA enabled software application on said computing system with data destinations other than said VIA enabled software application wherein a path for said data communications is through at least one Network Interface Card (NIC) with at least one port connection per each NIC, said data management component comprising:

a Physical NIC data structure for keeping data needed and used to manage each instance of a NIC, a Logical NIC data area useable by a Kernel Agent on said computer system to manage a plurality of logical NIC objects made visible to the Virtual Interface Provider Library and to the Application program, including a link to all Physical NICs for devices within said Logical NIC, said Logical NIC having a Master Completion Queue through which all completions for all Physical NICS associated with said Logical NIC, a protection tag table data structure for storing locally unique protection tag for each application, providing that each protection tag is a unique value within a NIC so that only one application's privileges are related to any one of said protection tags.

2. The data management system of claim 1 wherein the protection tag table, and a memory registration table are data structure components of said Logical NIC data area.

3. The data management system of claim 2 wherein a completion queue notification request area (CQNRA) is set up for each Logical NIC, so that the CQNRA can be responsive to completions of any master completion queue associated with any Physical NIC.

4. The data management system of claim 3 wherein a failure of any NIC device within a logical NIC of said computer system is not visible to an application program on said computer system with said data management system is using said Logical NIC so long as an additional NIC device is operational.

* * * * *